United States Patent
Wu et al.

(10) Patent No.: US 11,247,128 B2
(45) Date of Patent: Feb. 15, 2022

(54) METHOD FOR ADJUSTING THE STRENGTH OF TURN-BASED GAME AUTOMATICALLY

(71) Applicant: NATIONAL CHIAO TUNG UNIVERSITY, Hsinchu (TW)

(72) Inventors: I-Chen Wu, Hsinchu County (TW); Ti-Rong Wu, Tainan (TW); An-Jen Liu, Taipei (TW); Hung Guei, Taoyuan (TW); Ting-Han Wei, Taipei (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 98 days.

(21) Appl. No.: 16/869,779

(22) Filed: May 8, 2020

(65) Prior Publication Data
US 2021/0178273 A1    Jun. 17, 2021

(30) Foreign Application Priority Data
Dec. 13, 2019 (TW) .................. 108145654

(51) Int. Cl.
*A63F 13/67* (2014.01)
*A63F 13/822* (2014.01)
*G06N 7/00* (2006.01)

(52) U.S. Cl.
CPC ............ *A63F 13/67* (2014.09); *A63F 13/822* (2014.09); *G06N 7/005* (2013.01); *A63F 2300/6027* (2013.01)

(58) Field of Classification Search
CPC .................. A63F 13/67; A63F 13/822; A63F 2300/6027; G06N 7/005
See application file for complete search history.

(56) References Cited

U.S. PATENT DOCUMENTS

| | | | | |
|---|---|---|---|---|
| 5,653,635 | A * | 8/1997 | Breeding | A63F 3/00157 463/11 |
| 7,647,289 | B2 * | 1/2010 | Graepel | A63F 3/022 706/62 |
| 7,713,117 | B2 * | 5/2010 | Graepel | G16Z 99/00 463/9 |
| 8,105,149 | B2 * | 1/2012 | DeWaal | G07F 17/3262 463/20 |
| 8,379,540 | B2 * | 2/2013 | Gill | H04L 67/38 370/254 |
| 8,488,023 | B2 * | 7/2013 | Bacivarov | G06T 7/40 348/239 |
| 8,545,332 | B2 * | 10/2013 | Marecki | G07F 17/32 463/42 |
| 8,622,828 | B1 * | 1/2014 | Harrington | A63F 13/85 463/31 |

(Continued)

*Primary Examiner* — Ronald Laneau
*Assistant Examiner* — Matthew D Hoel
(74) *Attorney, Agent, or Firm* — Rosenberg, Klein & Lee

(57) ABSTRACT

The present invention relates to a method for adjusting the strength of turn-based game automatically. The method provides a search algorithm for inquiry and giving decision results. The decision results can be used for filtering and giving filtered results. Then a probability distribution result can be provided to control the virtual node inside the computer host. Furthermore, the game result can be used for adjusting the performance of the virtual node in the game. Thereby, the client node can evaluate its performance in the game conveniently.

10 Claims, 20 Drawing Sheets

(56) References Cited

U.S. PATENT DOCUMENTS

| | | | | |
|---|---|---|---|---|
| 8,734,243 | B2* | 5/2014 | Harrington | G06Q 50/01 463/29 |
| 8,764,561 | B1* | 7/2014 | Lan | A63F 13/12 463/31 |
| 8,777,742 | B2* | 7/2014 | Sato | A63F 13/44 463/32 |
| 8,808,090 | B2* | 8/2014 | Myogan | A63F 13/42 463/37 |
| 8,808,093 | B1* | 8/2014 | Reynolds | A63F 13/822 463/42 |
| 8,979,651 | B1* | 3/2015 | Lan | A63F 13/79 463/31 |
| 8,986,116 | B1* | 3/2015 | Harrington | A63F 13/53 463/29 |
| 9,355,102 | B2* | 5/2016 | Thukral | G06F 16/44 |
| 9,486,709 | B1* | 11/2016 | Lan | A63F 13/79 |
| 9,643,080 | B2* | 5/2017 | Reynolds | A63F 13/795 |
| 9,968,849 | B1* | 5/2018 | Lan | A63F 13/25 |
| 10,016,686 | B2* | 7/2018 | Eika | A63F 13/795 |
| 10,105,603 | B2* | 10/2018 | Bucher | A63F 13/79 |
| 10,213,688 | B2* | 2/2019 | Gewicke | G06T 19/006 |
| 10,376,788 | B2* | 8/2019 | Lan | A63F 13/25 |
| 10,387,161 | B2* | 8/2019 | Tian | G06N 20/00 |
| 10,391,388 | B2* | 8/2019 | Kamekawa | A63F 13/87 |
| 10,403,097 | B2* | 9/2019 | Nakamura | G07F 17/34 |
| 10,453,305 | B2* | 10/2019 | Gilmore | G07F 17/3267 |
| 10,456,666 | B2* | 10/2019 | Hicks | H04N 5/23232 |
| 10,467,865 | B2* | 11/2019 | Gilmore | G07F 17/3244 |
| 10,610,771 | B2* | 4/2020 | Kamekawa | A63F 13/79 |
| 10,610,785 | B2* | 4/2020 | Onishi | A63F 13/79 |
| 10,625,149 | B2* | 4/2020 | Kamekawa | A63F 13/88 |
| 10,646,781 | B2* | 5/2020 | Lan | A63F 13/795 |
| 10,729,979 | B2* | 8/2020 | Bucher | A63F 13/67 |
| 10,780,348 | B2* | 9/2020 | Du | A63F 13/67 |
| 10,881,950 | B2* | 1/2021 | Kamekawa | A63F 13/50 |
| 10,885,749 | B2* | 1/2021 | Nakamura | G07F 17/326 |
| 10,967,259 | B1* | 4/2021 | Berg | A63F 13/352 |
| 10,981,052 | B2* | 4/2021 | Kuwatani | H04L 51/04 |
| 10,981,067 | B2* | 4/2021 | Kuwatani | A63F 13/87 |
| 10,987,584 | B2* | 4/2021 | Lan | A63F 13/5375 |
| 11,043,071 | B2* | 6/2021 | Crittenden | G07F 17/3225 |
| 11,058,957 | B2* | 7/2021 | Li | A63F 13/798 |
| 11,083,959 | B2* | 8/2021 | Kuwatani | A63F 13/26 |
| 11,103,781 | B2* | 8/2021 | Kamekawa | A63F 13/50 |
| 11,110,346 | B2* | 9/2021 | Kuwatani | A63F 13/21 |
| 2008/0004096 | A1* | 1/2008 | Graepel | G09B 19/22 463/9 |
| 2008/0027570 | A1* | 1/2008 | Graepel | G16Z 99/00 700/91 |
| 2009/0270166 | A1* | 10/2009 | Thukral | G06F 16/4393 463/25 |
| 2011/0269546 | A1* | 11/2011 | Gill | A63F 13/31 463/42 |
| 2013/0116044 | A1* | 5/2013 | Schwartz | A63F 13/12 463/29 |
| 2013/0204412 | A1* | 8/2013 | Marecki | G07F 17/32 700/93 |
| 2014/0066191 | A1* | 3/2014 | Yang | A63F 13/798 463/29 |
| 2014/0087355 | A1* | 3/2014 | Henry | G09B 7/00 434/362 |
| 2014/0248950 | A1* | 9/2014 | Bautista | G06F 1/1694 463/31 |
| 2014/0349769 | A1* | 11/2014 | Reynolds | A63F 13/795 463/42 |
| 2015/0251098 | A1* | 9/2015 | Schwartz | A63F 9/183 463/9 |
| 2015/0304394 | A1* | 10/2015 | Virtanen | H04L 67/10 709/201 |
| 2017/0061704 | A1* | 3/2017 | Gewicke | A63F 13/30 |
| 2017/0136362 | A1* | 5/2017 | Bucher | A63F 13/79 |
| 2018/0296912 | A1* | 10/2018 | Hicks | A63F 13/65 |
| 2019/0022531 | A1* | 1/2019 | Bucher | A63F 13/67 |
| 2019/0073224 | A1* | 3/2019 | Tian | G06F 9/3851 |
| 2019/0118085 | A1* | 4/2019 | Li | A63F 13/42 |
| 2019/0159716 | A1* | 5/2019 | Alailima | A61B 5/162 |
| 2019/0184286 | A1* | 6/2019 | Du | A63F 13/67 |
| 2019/0216392 | A1* | 7/2019 | Bower | G16H 20/30 |
| 2019/0261908 | A1* | 8/2019 | Alailima | G09B 7/02 |
| 2019/0351334 | A1* | 11/2019 | Li | A63F 13/35 |
| 2020/0070055 | A1* | 3/2020 | Du | A63F 13/822 |
| 2020/0174557 | A1* | 6/2020 | Alailima | A61B 5/4833 |
| 2020/0257943 | A1* | 8/2020 | Huber | G06F 16/907 |
| 2020/0349905 | A1* | 11/2020 | Hicks | G09G 5/39 |
| 2020/0380882 | A1* | 12/2020 | Alailima | G09B 19/00 |
| 2021/0042424 | A1* | 2/2021 | Kursun | A63F 13/75 |
| 2021/0178273 | A1* | 6/2021 | Wu | G06N 7/005 |
| 2021/0213353 | A1* | 7/2021 | Berg | A63F 13/352 |
| 2021/0252397 | A1* | 8/2021 | Gewickey | A63F 13/28 |

* cited by examiner

METHOD FOR ADJUSTING THE STRENGTH OF TURN-BASED GAME AUTOMATICALLY

FIELD OF THE INVENTION

The present invention relates generally to an execution method for automatic system, and particularly to a method for adjusting the strength of turn-based game automatically.

BACKGROUND OF THE INVENTION

In recent years, as mobile devices are developed prosperously, online mobile games become more popular. By matching players to enter the two- or multi-player battle mode, players can enjoy the fun of battles with other people. Due to serious competition in work, modern people endure huge pressure. Thereby, leisure activities are indispensable. Some people use drawing, ceramic art, or reading as leisure activities; some take part in sports or fishing. Various leisure games are provided to consumers for playing. Nonetheless, if the online player at certain times are too few, players will find no player to battle with. Accordingly, to make players enjoy the fun of battle anytime, game developers integrate artificial intelligence in games. Then computers can emulate the behaviors of real players to battle with players.

New participants of a game will create a virtual figure in the opposite team for adapting to the online game. As the game evolves, it will be difficult for new participants to adapt to the current the strength of game once they are used to the virtual figures only. Then the new participants have nothing to do but losing interest on the game and aborting the game, resulting in difficulty on maintaining the game. In addition, due to lack of ability on the game, new participants or junior participants with low records may affect the performance of the team. They have to endure complaints from other participants. Consequently, new participant will dislike the game.

From the viewpoint of game-system operators in cost return and increasing revenue, it is preferred that players can long-term play online games continuously. Thereby, game-system operators try to enhance players' willingness in playing their games by improving game system or adding new plots, scenes, maps, or roles.

In addition, online games include battle games, for example, massive multiplayer online role-playing games (MMORPG), fighting games, and online racing games. Multiple players can compete in the games concurrently. Alternatively, two single players can compete as well. Presently, among this type of battle games, the most popular one is the first person shooting (FPS) games.

Online games provide a game lobby on the user interface so that users can create battle rooms for different team to attract teammates.

Unfortunately, the improvement of game system or the addition of game plots increases the development loads. The improvement effect is also limited, making the incentive of players to play the game repeatedly insufficient. Thereby, given the condition of new users joining the game continuously, how virtual objects can help new users to adapt to the game environment becomes the major challenge faced by game-system operators.

Accordingly, the present invention provides a method for adjusting the strength of turn-based game automatically. The method performs simulation and decision according to the execution level of a user in the game environment.

SUMMARY

An objective of the present invention is to provide a method for adjusting the strength of turn-based game automatically. The method uses a search algorithm to simulate and decide the probability distribution of a game program. Then the computer host can adjust the game strength automatically with enhanced efficiency and hence improving the playability of games.

Another objective of the present invention is to provide a method for adjusting the strength of turn-based game automatically. The method uses a search algorithm to simulate and decide the probability distribution of a game program. Then the computer host can adjust the parameters of game strength automatically and evaluate the level of a user in the game.

The present invention discloses a method for adjusting the strength of turn-based game automatically. The application is that a client computer host executes a game program according to the client node and a virtual node. The game program includes an execution region. The client node and the virtual node control adding one or more first virtual object and one or more virtual object in the execution region, respectively. The virtual node executes the method in each turn. The method is that the computer host acquires a plurality of decision results according to a Monte Carlo tree search (MCTS) algorithm and the execution region. Next, the computer host generates a threshold value according a corresponding game-strength parameter of the execution region for filtering the plurality of decision results and generating a plurality of filtered results. Afterwards, the computer host performs correlation calculation and the game strength parameter according to the plurality of filtered results to generate a probability distribution result. Finally, the computer host controls the virtual node according to the probability result to add the one or more second virtual object at the coordinate location in the execution region. Thereby, according to the present invention, for a turn-based game, the computer host can use the virtual node to battle with the client node operated by the user. The computer host controls the virtual node according to the coordinate location of the virtual object in the execution region to add the corresponding virtual object in the execution region according to the probability distribution result. Thereby, in addition to increasing the playability of the game, the computer host can adjust the performance of the virtual node according to the performance of the user in each turn.

According to an embodiment of the present invention, before the step of the computer host acquiring a plurality of decision results according to a Monte Carlo tree search (MCTS) algorithm and the execution region, the computer host judges if the virtual node executes first. If not, the client node executes first. Otherwise, the computer host executes the step of the computer host searches a plurality of game data in the storage unit according to the execution region. When the computer host judges that the client node adds another first virtual object, the client node adds another second virtual object in the execution region. Then the computer host of the one or more client node judges if the game ends. Next, when the game has not ended, the computer host executes the step of the computer host searches a plurality of game data in the storage unit according to the execution region. Otherwise, the computer ends the game and delivers a game result to the client node.

According to an embodiment of the present invention, before the step of the computer host searches a plurality of game data in the storage unit according to the execution region, the computer host further receives a level setting value of the client node. Then the computer host searches according to the execution region and the level setting value to give the plurality of decision results.

According to an embodiment of the present invention, after the step of the computer host controlling the virtual node according to the probability result to add the one or more second virtual object at the coordinate location in the execution region, the computer host further reads a plurality of game results of the client node versus the virtual node from the storage unit. Next, the computer adjusts a game strength parameter according to the plurality of game results.

According to an embodiment of the present invention, after the step of the computer host controlling the virtual node according to the probability result to add the one or more second virtual object at the coordinate location in the execution region, the computer host further reads the connection count of the client node to the game program. Next, a certificate level of the client node is judged according to the connection count to the game program and the plurality of game results or according to the connection count to the game program and a game strength of the virtual node.

The present invention discloses a method for adjusting the strength of turn-based game automatically. The application is that a computer host is connected to one or more client node and a storage unit. The computer host executes a game program according to the client node and a virtual node. The game program includes an execution region. The client node and the virtual node control moving a plurality of first virtual objects and a plurality of virtual objects in the execution region, respectively. The virtual node executes the method in each turn. The method is that the computer host acquires a plurality of decision results according to a Monte Carlo tree search (MCTS) algorithm and the execution region. Next, the computer host generates a threshold value according the decision results and a corresponding threshold parameter of the execution region for filtering the plurality of decision results and generating a plurality of filtered results. Afterwards, the computer host performs correlation calculation according to the plurality of filtered results and a game strength parameter of the virtual node to generate a probability distribution result. Finally, the computer host controls the virtual node according to the probability result to move one or more of the plurality of second virtual objects to the coordinate location in the execution region. Thereby, according to the present invention, for a turn-based game, the computer host can use the virtual node to battle with the client node operated by the user. The computer host controls the virtual node to move the corresponding virtual object in the execution region according to the probability distribution result. Thereby, in addition to increasing the playability of the game, the computer host can adjust the performance of the virtual node according to the performance of the user in each turn.

According to another embodiment of the present invention, before the step of the computer host acquiring a plurality of decision results according to a Monte Carlo tree search (MCTS) algorithm and the execution region, the computer host judges if the virtual node executes first. If not, the client node adds another first virtual object at the coordinate location in the execution region. Otherwise, the computer host executes the step of the computer host searching the decision results according to the execution region. After the client node adds another first virtual object to the coordinate location, the computer host judges if the game ends according to the game result of the first virtual object and the second virtual object. Next, when the game result of the first virtual object and the second virtual object has not determined and the game has not ended, the computer host executes the step of the computer host acquires a plurality of decision results according to a Monte Carlo tree search (MCTS) algorithm and the execution region. Otherwise, the computer ends the game and delivers a game result to the client node.

According to another embodiment of the present invention, before the step of the computer host searches a plurality of game data in the storage unit according to the execution region, the computer host further receives a level setting value of the client node. Then the computer host searches according to the execution region and the level setting value to give the plurality of decision results.

According to another embodiment of the present invention, after the step of the computer host controlling the virtual node according to the probability result to add the one or more second virtual object at the coordinate location in the execution region, the computer host further reads a plurality of game results of the client node versus the virtual node from the storage unit. Next, the computer adjusts a game strength parameter according to the plurality of game results.

According to another embodiment of the present invention, after the step of the computer host controlling the virtual node according to the probability result to add the one or more second virtual object at the coordinate location in the execution region, the computer host further reads the connection count of the client node to the game program. Next, a certificate level of the client node is judged according to the connection count to the game program and the plurality of game results or according to the connection count to the game program and a game-strength parameter of the virtual node.

DETAILED DESCRIPTION

In order to make the structure and characteristics as well as the effectiveness of the present invention to be further understood and recognized, the detailed description of the present invention is provided as follows along with embodiments and accompanying figures.

Considering that the game strength of the virtual objects in the game system according to the prior art is insufficient, the present invention provides a method for adjusting the strength of turn-based game automatically for solving the problem of monotonous game strength provided by the virtual objects in the game system according to the prior art.

In the following, the properties and the accompanying system of the method for adjusting the strength of turn-based game automatically according to the present invention will be further described.

Figure 1:
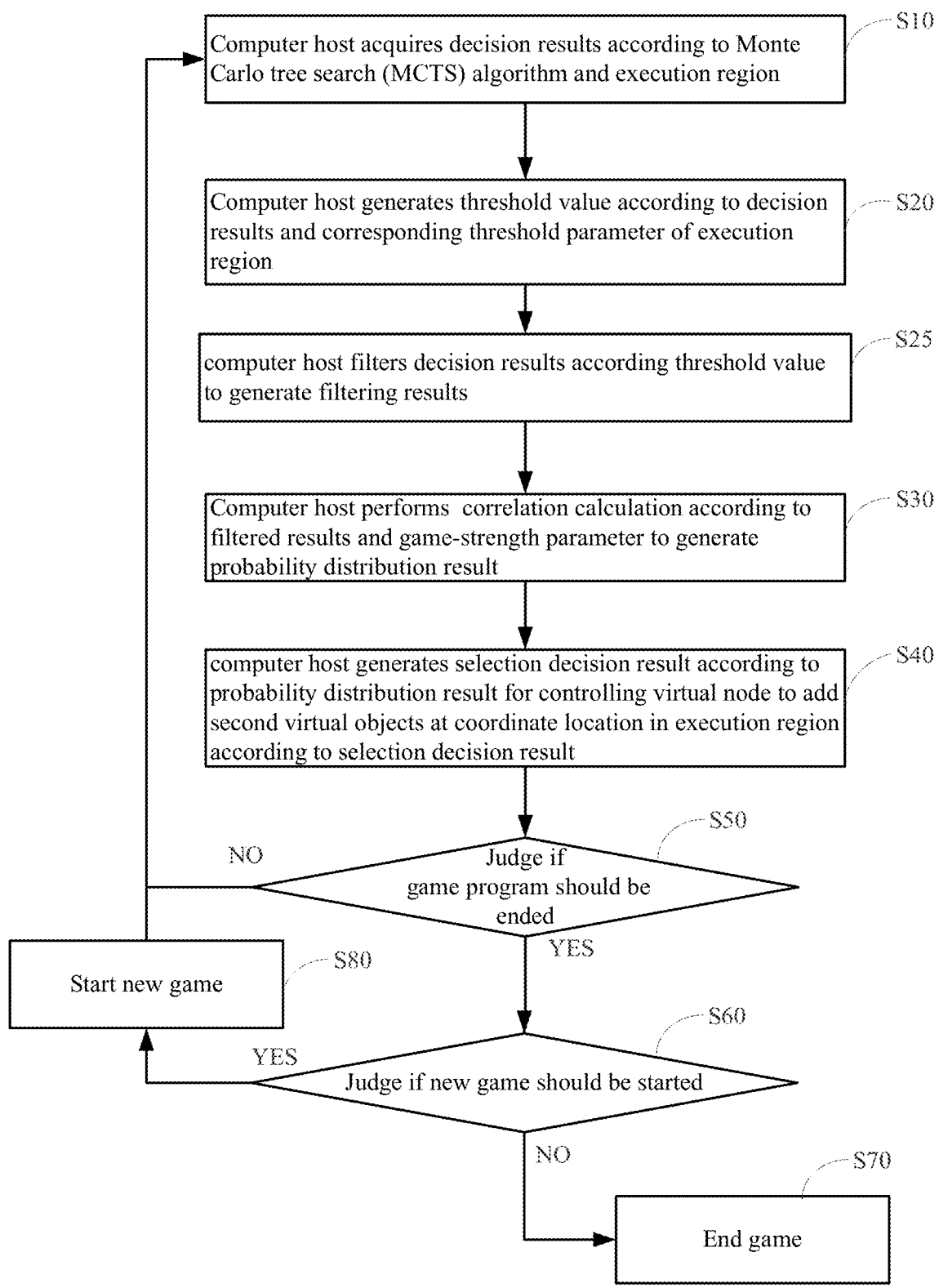
FIG. 1 shows a flowchart of the turn-based game according to an embodiment of the present invention.

First, please refer to FIG. 1, which shows a flowchart of the turn-based game according to an embodiment of the present invention. As shown in the figure, the method for adjusting the strength of turn-based game automatically according to the present invention comprises steps of:

Step S10: Computer host acquires decision results according to Monte Carlo tree search (MCTS) algorithm and execution region;

Step S20: Computer host generates threshold value according to decision results and corresponding threshold parameter of execution region;

Step S25: Computer host filters decision results according threshold value to generate filtered results;

Step S30: Computer host performs correlation calculation according to filtered results and game-strength parameter to generate probability distribution result; and Step S40: Computer host generates selected decision result according to probability distribution result for controlling virtual node to add second virtual objects at coordinate location in execution region according to selected decision result.

Please refer to FIG. 2A to FIG. 2D, which show the game system 1 accompanying the method for adjusting the strength of turn-based game automatically according to the present invention. The game system 1 comprises a computer host 1. According to the present embodiment, a client node 20 of the computer host 10 is taken as an example. Nonetheless, the present invention is not limited to the example. Multiple client nodes 20 can be connected to the computer host 10. The database 30 is a storage unit S built in the computer host 10. Alternatively, the database 30 can be an external storage unit of the computer host 10. The computer host 10 executes a game program P via a processing module PM and build a virtual node 102 corresponding to the client node 20.

Figure 2A:
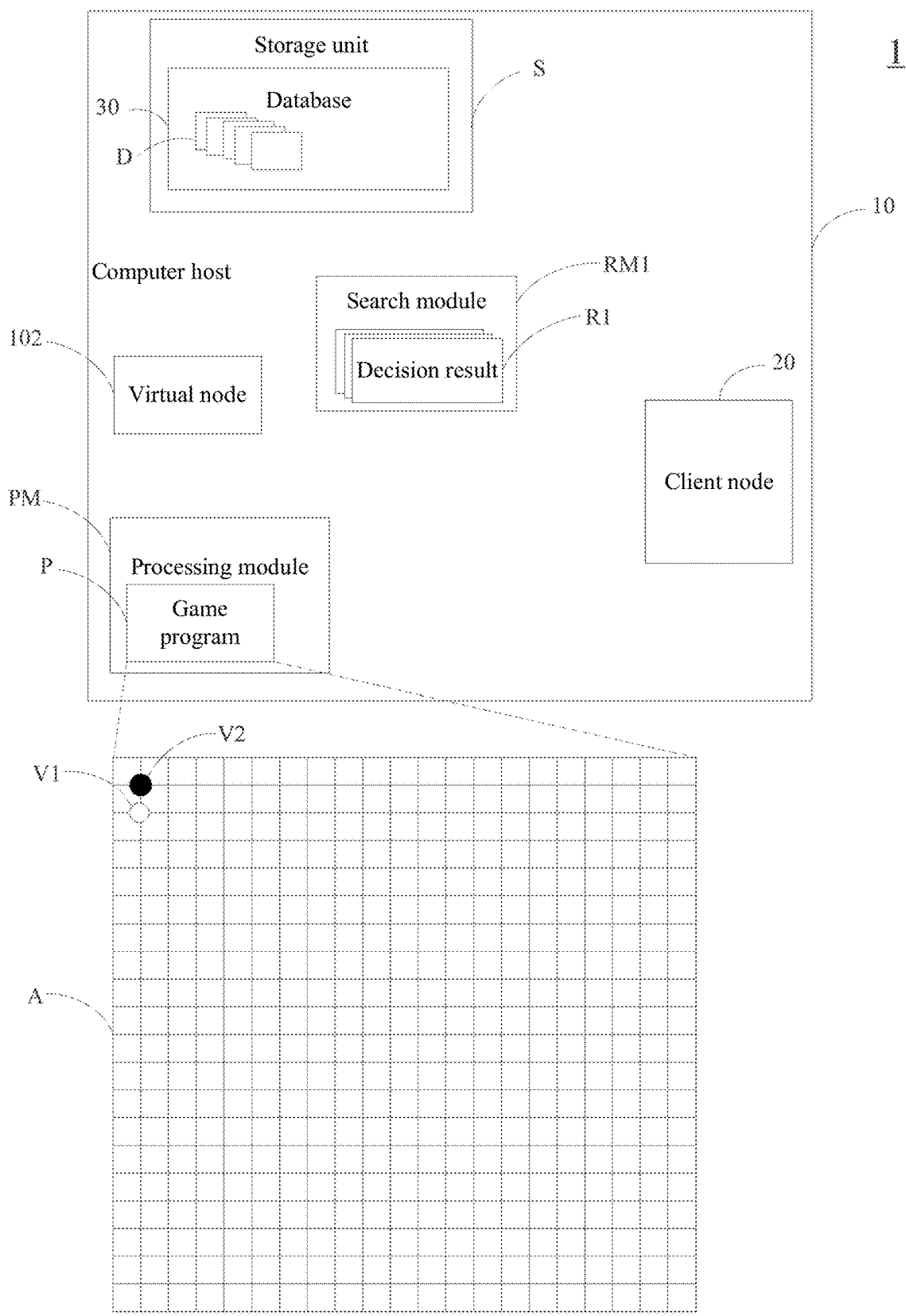
FIG. 2A to FIG. 2D show schematic diagrams of partial steps according to an embodiment of the present invention.

In the step S10, as shown in FIG. 2A, the game program P includes a built-in execution region A. When the computer host 10 execute the game program P, the client node 20 and the virtual node 102 will control one or more first virtual object V1 and one or more second virtual object V2 to be added in the execution region A, respectively. The computer host 10 will first use a search module RM1 to search a plurality of corresponding game data D according to the execution region A in the game program P. The plurality of game data are stored in the database 30. For example, the game program P is a game of go. Thereby, the search module RM1 searches a plurality of corresponding decision results R1, namely, the decision from the start to the end of the game, according to a Monte Carlo tree search (MCTS) algorithm and the game data D related to the game of go in the database 30. The computer host 10 further adopts the upper confidence bounds algorithm according to a Monte Carlo tree search (MCTS) algorithm with the equation of:

$$UCB_i = Q_i + C\sqrt{\frac{\ln N}{N_i}} \qquad \text{Equation 1}$$

where $Q_i$ is the probability of win; i represents the i-th candidate movement; N is the current search quantity; $N_i$ is the current search number of the i-th candidate movement; and C is the search weighting constant.

Figure 2B:
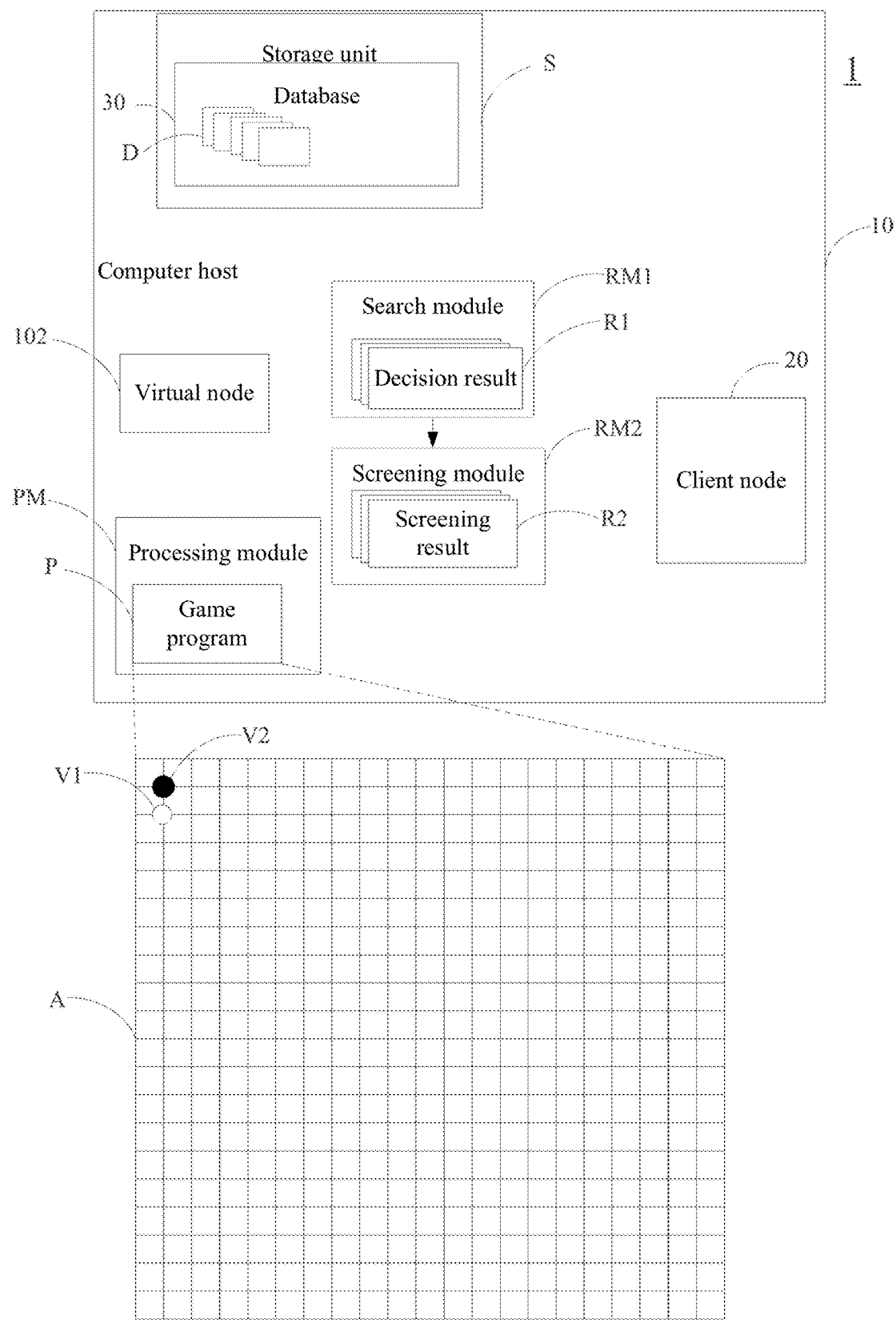
Figure 3A:
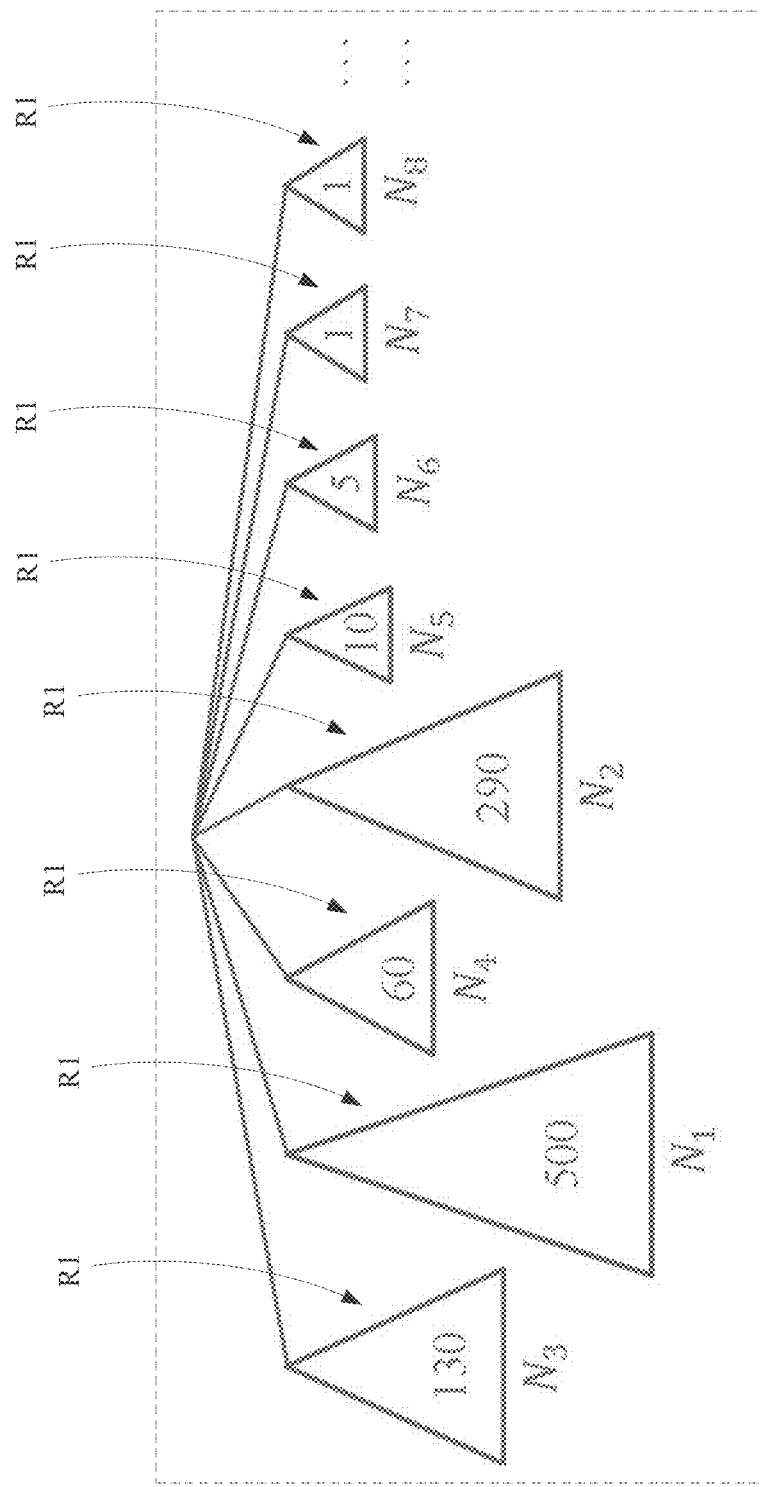
FIG. 3A shows a schematic diagram of the search result according to an embodiment of the present invention.
Figure 3B:
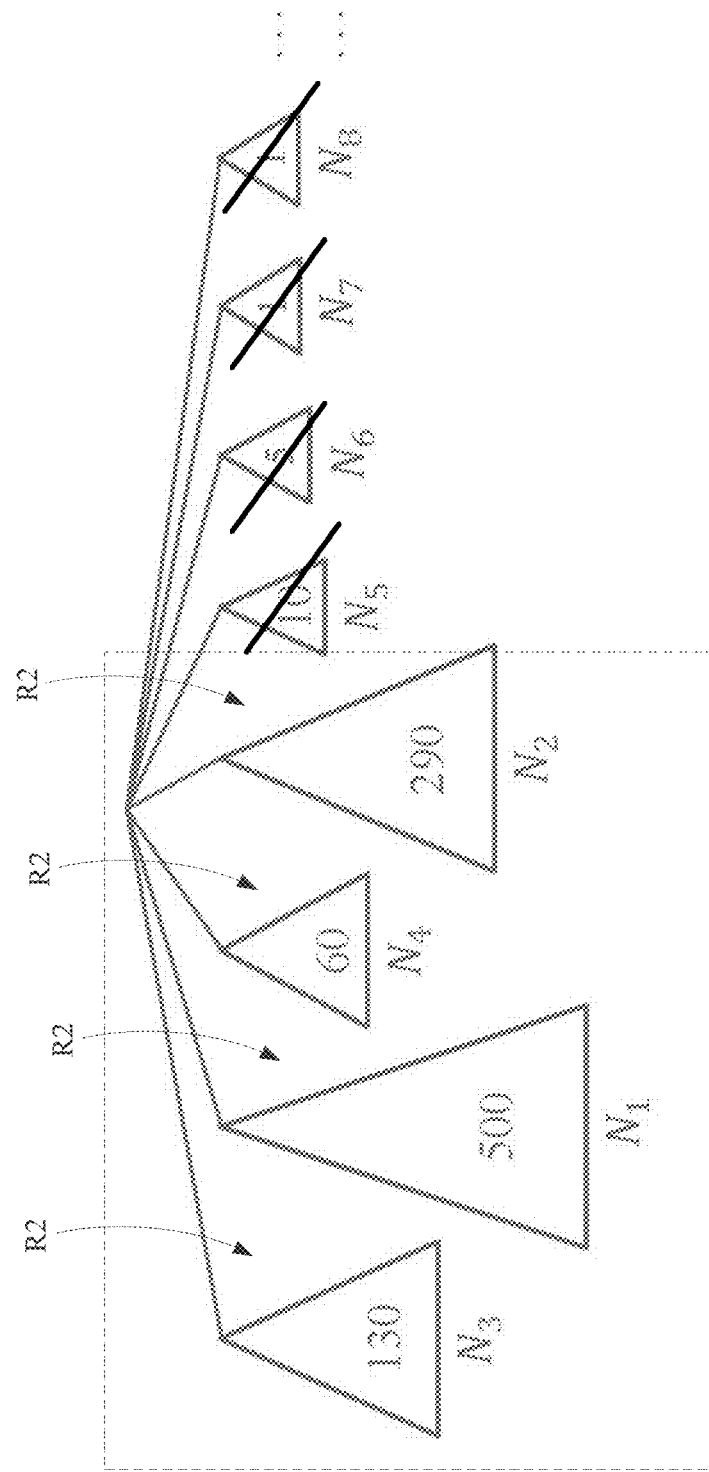
FIG. 3B shows a schematic diagram of the filtered result according to an embodiment of the present invention.

As shown in FIG. 3A, the search module RM1 of the computer host 10 searches the plurality of game data D according to a Monte Carlo tree search (MCTS) algorithm. The searched decision results R1 is the probability result generated according to Equation 2:

$$\pi_i = \frac{N_i^z}{\Sigma_j N_j^z} \qquad \text{Equation 2}$$

where i represents the i-th candidate movement; $N_i$ is the current search number of the i-th candidate movement; z is the game-strength parameter. In the step S20, as shown in FIG. 2B, the computer host 10 sets the corresponding game-strength parameter z at the coordinate location in the execution region A according to the first virtual object V1 for producing the corresponding filtering equation, which is used to filter the corresponding decision results R1 for producing the corresponding filtered results R2. According to the present embodiment, the corresponding filtered results R2 are filtered from a plurality of decision results R1. The filtering equation is:

$$\text{Filtering value} = N_1 \times R_{th} \qquad \text{Equation 3}$$

where $N_1$ is the maximum simulation counts in the Monte Carlo search tree for obtaining each decision result R1; and $R_{th}$ is the filtering threshold ratio. Assuming $N_1$ is 500 and $R_{th}$ is 0.1, the filtering threshold value will be 50. Then the filtered results R2 will be given. Next, in the step S25, in a filter module RM2, the filtering threshold value produced in the step S20 will be used for filtering and producing a plurality of filtered results R2, as shown in FIG. 3B. Filtering the decision results R1 that comply with the filtering threshold ratio gives the filtered results R2.

Figure 2C:
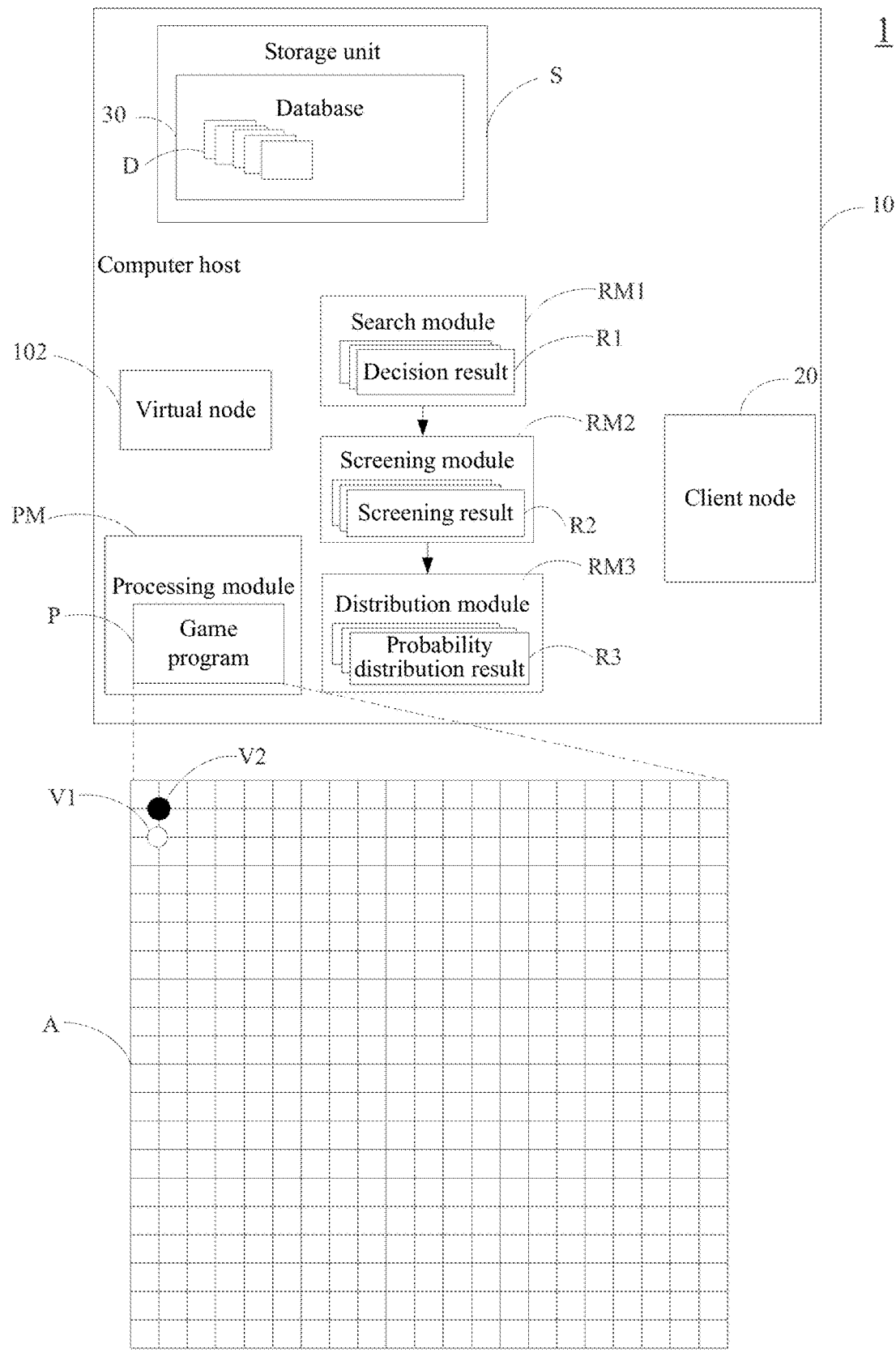
Figure 2D:
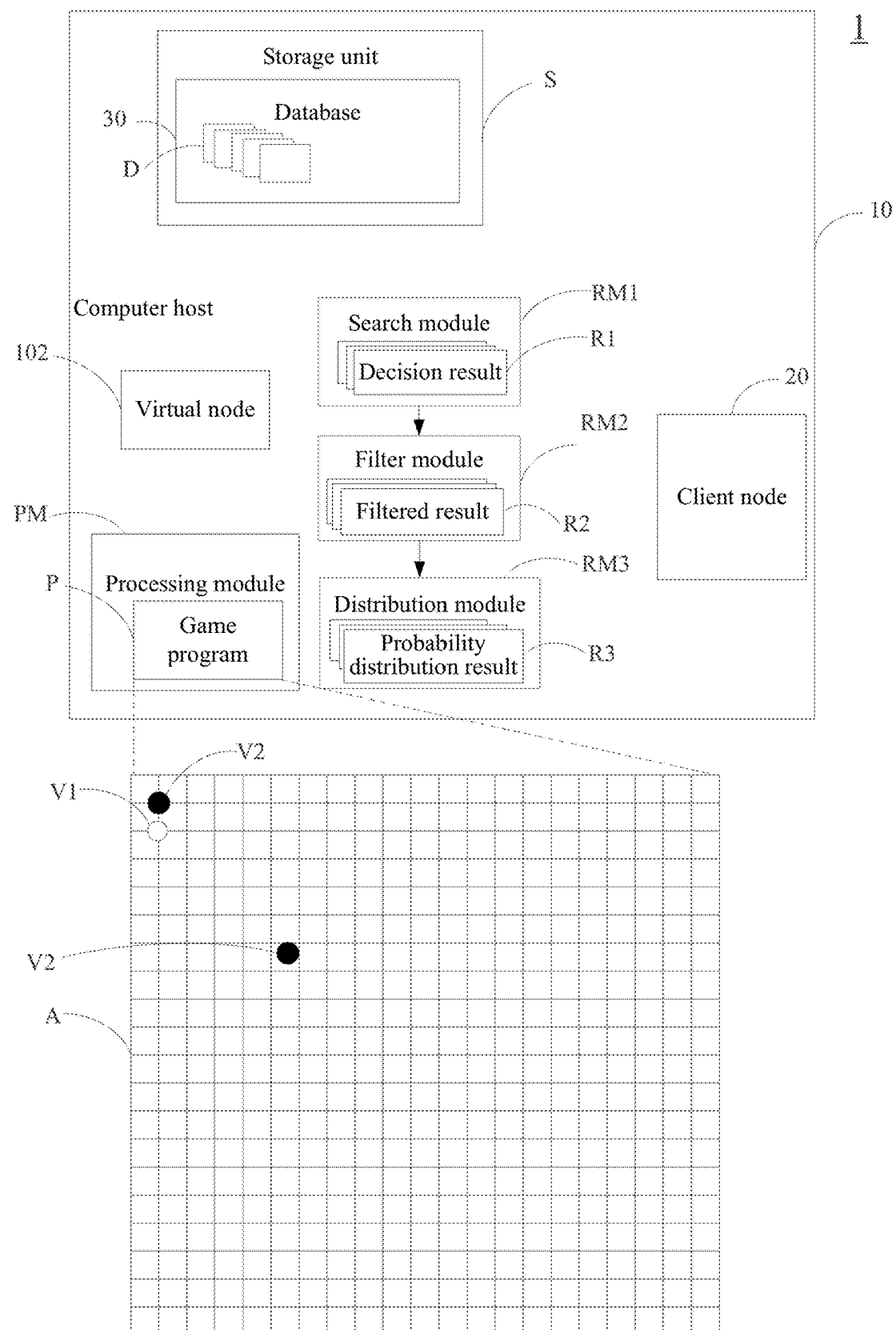
Figure 3C:
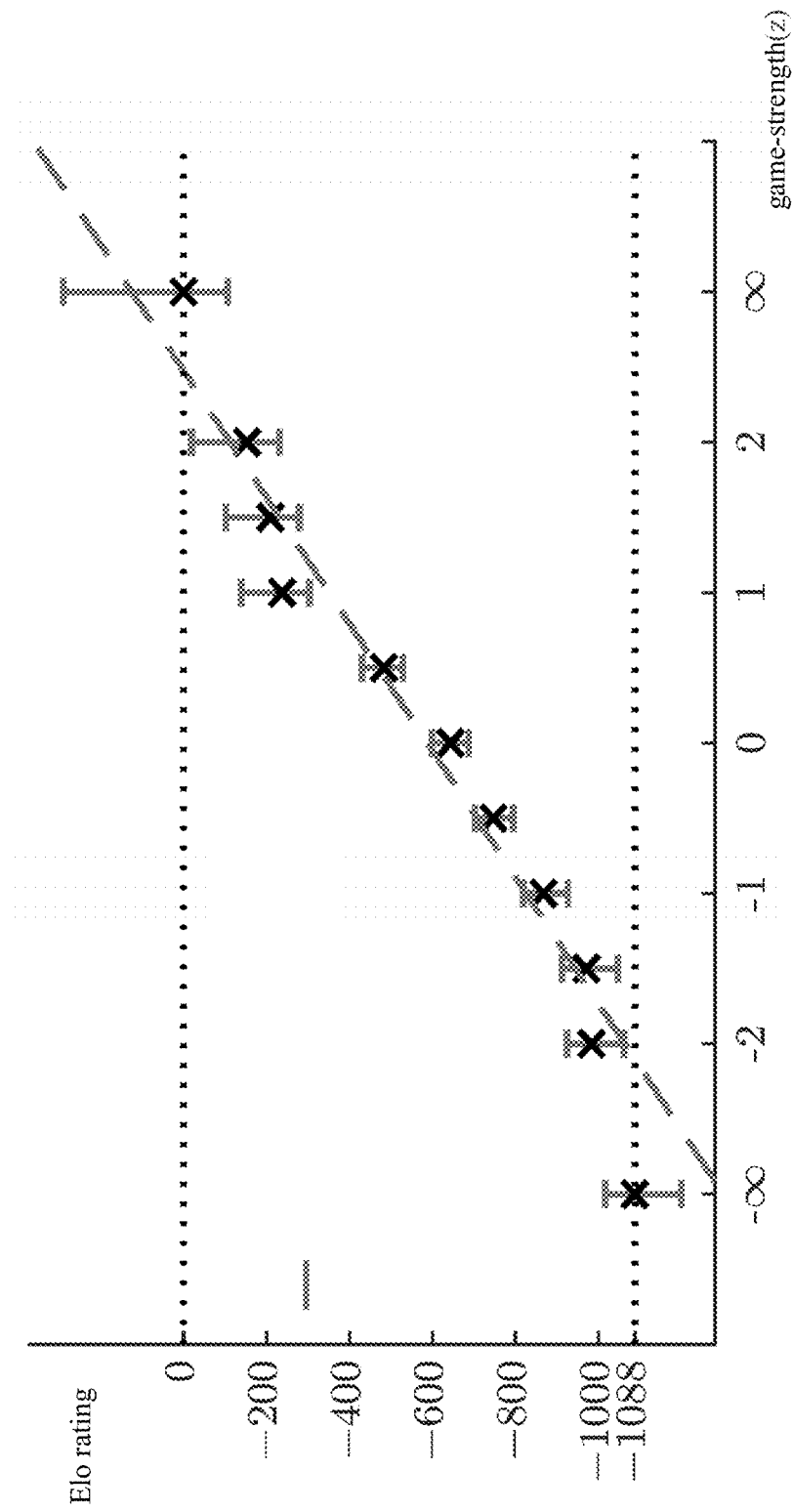
FIG. 3C shows a schematic diagram of the influence of Elo rating on game-strength parameter according to an embodiment of the present invention.

In the step S30, as shown in FIG. 2C, the computer host 10 uses the distribution module RM3 to produces a probability distribution result R3 according to the filtered result R2. As shown in FIG. 3C, based on the game-strength parameter $z=\pm 2$, the correlation between the game-strength parameter z and the Elo rating at the virtual node 102 approximates to be linear, where the x-axis is the game-strength parameter and the y-axis is the corresponding Elo rating. Further, the game-strength parameter means a game strength of an executed game in the game program P. In the step S40, as shown in FIG. 2D, the computer host 10 selects the selected decision result from the plurality of filtered results R2 according to the probability distribution result R3 for controlling the virtual node 102 to add one or more second virtual object V2 at another coordinate location in the execution region A, namely, the intersection of lines.

In addition, as shown in FIG. 1, the method for adjusting the strength of turn-based game automatically further comprises steps of:
Step S50: Judge if game program should be ended;
Step S60: Judge if new game should be started;
Step S70: End game; and
Step S80: Start new game.

In the step S50, the computer host 10 judges if the game program P executed by the processing module PM should be ended according to the game result of the first virtual object V1 and the second virtual object V2 in the execution region A. When the game result of the first virtual object V1 and the second virtual object V2 in the execution region A is not determined yet and the judging is negative, the step S10 is executed; otherwise, the step S60 is executed. In the step S60, the computer host 10 judges if the client node 20 needs to start a new game in the game program P. If not, the step S70 will be executed; otherwise, the step S80 will be executed. In the step S70, the computer host 10 ends the game program P executed by the processing module PM to end the game between the client node 20 and the virtual node 102. In the step S80, the computer host 10 executes the game program P in the processing module PM to make the client node 10 and the virtual node 102 play again and return to the step S10.

Figure 4:
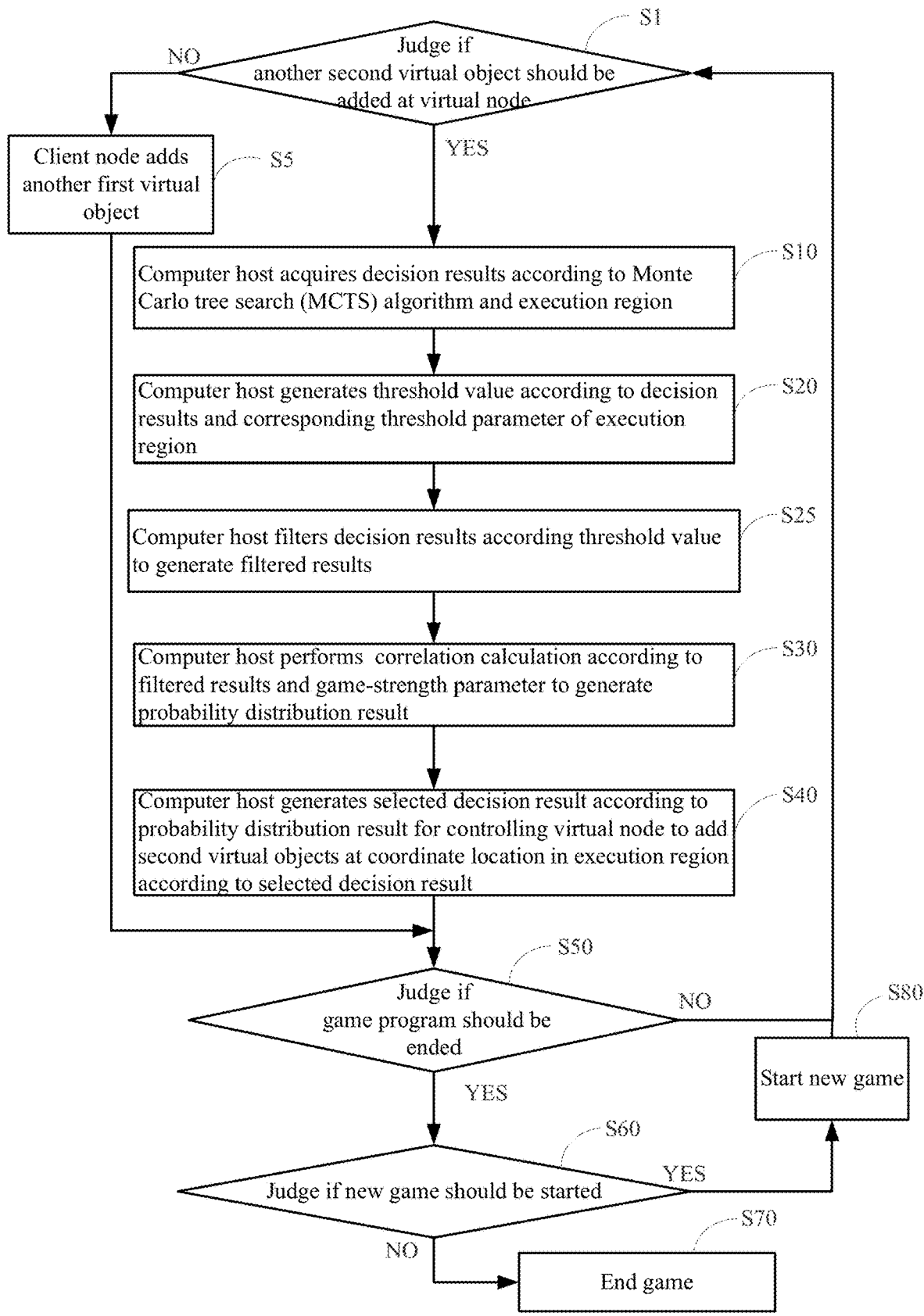
FIG. 4 shows a flowchart of the turn-based game according to another embodiment of the present invention.

Please refer to FIG. 4, which shows a flowchart according to another embodiment of the present invention. The difference between FIG. 1 and FIG. 4 is that FIG. 4 further includes:
Step S1: Judge if another second virtual object should be added at virtual node; and
Step S5: Client node adds another first virtual object.

In the step S1, the computer host 10 first judges whether the virtual node 102 adds another second virtual object V2 or the client node 20 adds another first virtual object V1 in the current turn. When the computer host 10 judges that the client node 20 adds another first virtual object V1, the step S5 is executed; otherwise, the step S20 is executed. In the step S5, the computer host 10 grants the priority of the current turn to the client node 20 to add another first virtual object V1.

Figure 5:
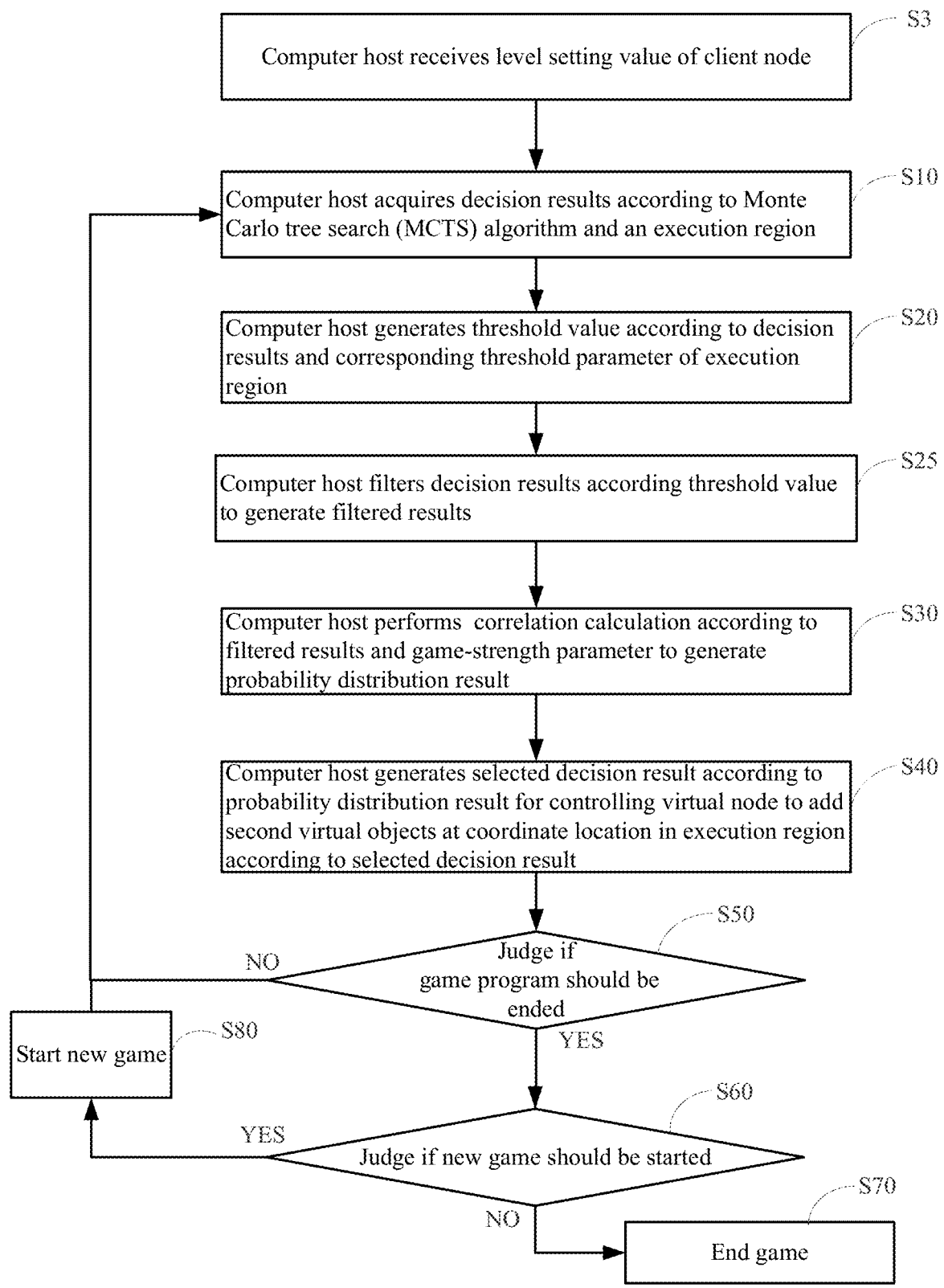
FIG. 5 shows a flowchart of the turn-based game according to another embodiment of the present invention.

Please refer to FIG. 5, which shows a flowchart according to another embodiment of the present invention. The difference between FIG. 4 and FIG. 5 is that the steps S1, S5, and the steps S10 to S80 are executed in FIG. 4 while the steps S3 to S80 are executed in FIG. 5. In particular, whether the virtual node 102 should be executed first is judged in FIG. 4. Besides, the level setting values are received by the client node 20 in FIG. 5.
Step S3: Computer host receives level setting value of client node;
Step S10: Computer host acquires decision results according to Monte Carlo tree search (MCTS) algorithm and an execution region;
Step S20: Computer host generates threshold value according to corresponding decision results and threshold parameter of execution region;
Step S25: Computer host filters decision results according threshold value to generate filtered results;
Step S30: Computer host performs correlation calculation according to filtered results and game-strength parameter to generate probability distribution result; and
Step S40: Computer host generates selected decision result according to probability distribution result for controlling virtual node to add second virtual objects at coordinate location in execution region according to selected decision result.

In the step S3, the computer host 10 receives the level setting value input from the client node 20, such as the levels for the game of Go, Chinese Chess, Military Chess, and Sand-table, even the Chess. In the step S20, in addition to searching the game data D according tot execution region A, the computer host 10 further searches the game data D according to the level setting value for acquiring the corresponding decision results R1. For example, the decision result R1 acquired corresponding to the Elo rating −200 will be a decision with higher game-strength parameter than the one acquired according to the Elo rating −1000. Thereby, as shown in FIG. 3C, the Elo rating influences the game-strength parameter and further influences the decision results R1. The steps S20 to S80 are identical to those according to the previous embodiment. Hence, the details will not be described again.

According to the above embodiment, the computer host 10 uses the execution region A as the reference for searching the database and giving the corresponding decision results R. The decision results R are further filtered to give the filtered results R2, which is used to further produce the probability distribution result R3 for controlling the decision of adding the second virtual object V2 at the virtual node 102 in the execution region A and adjusting the game difficulty correspondingly. Consequently, the virtual node 102 can match the game performance of the client node 20 in the game program.

In addition to the above adjusting method, the present invention can further adjust according to the game result.

Figure 6:
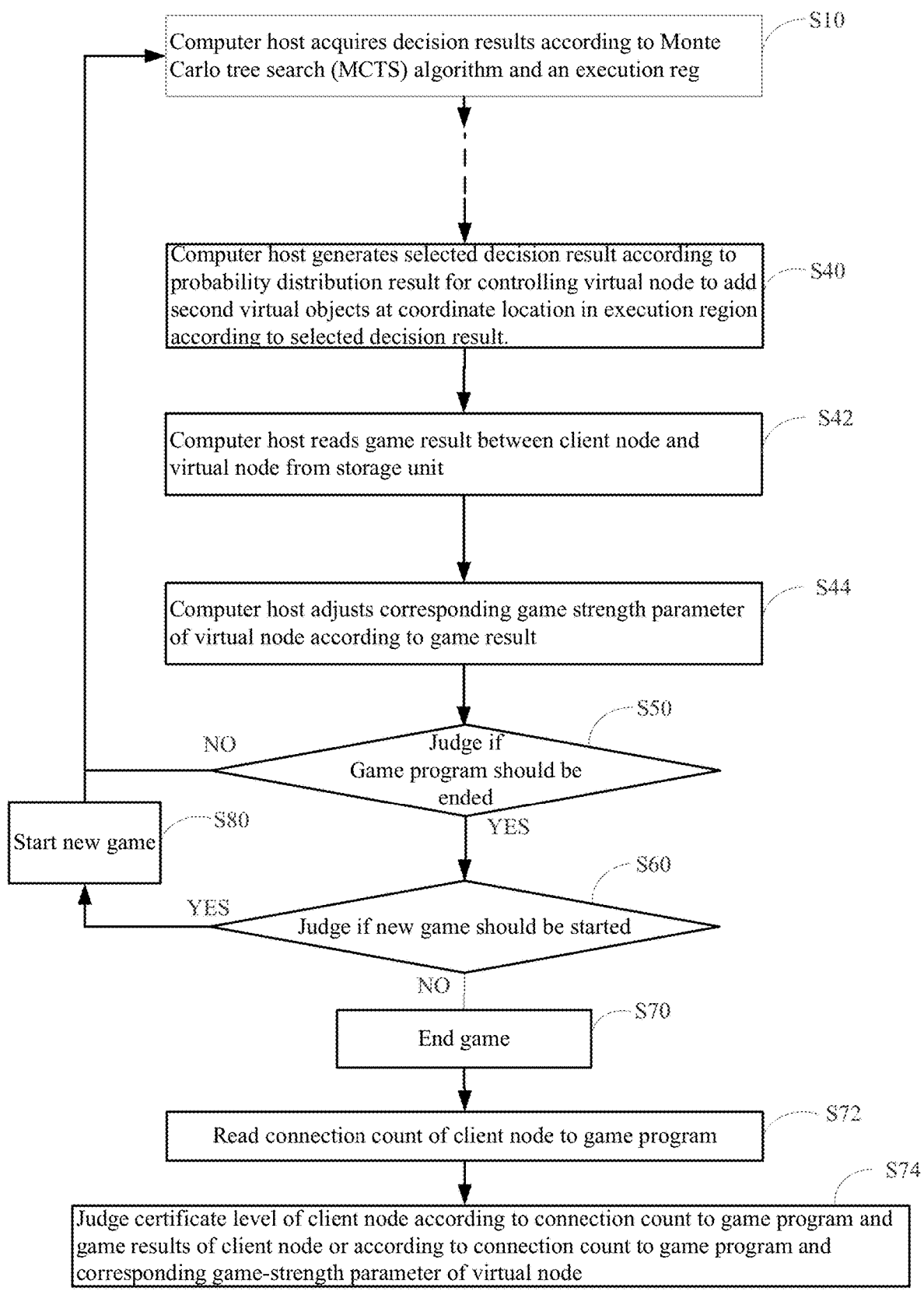
FIG. 6 shows a flowchart of the turn-based game according to another embodiment of the present invention.

Please refer to FIG. 6, which shows a flowchart of the turn-based game according to another embodiment of the present invention. As shown in the figure, the method for adjusting the strength of turn-based game automatically further comprises steps of:
Step S42: Computer host reads game result between client node and virtual node from storage unit; and
Step S44: Computer host adjusts corresponding game strength parameter of the virtual node according to the game result.

Figure 7:
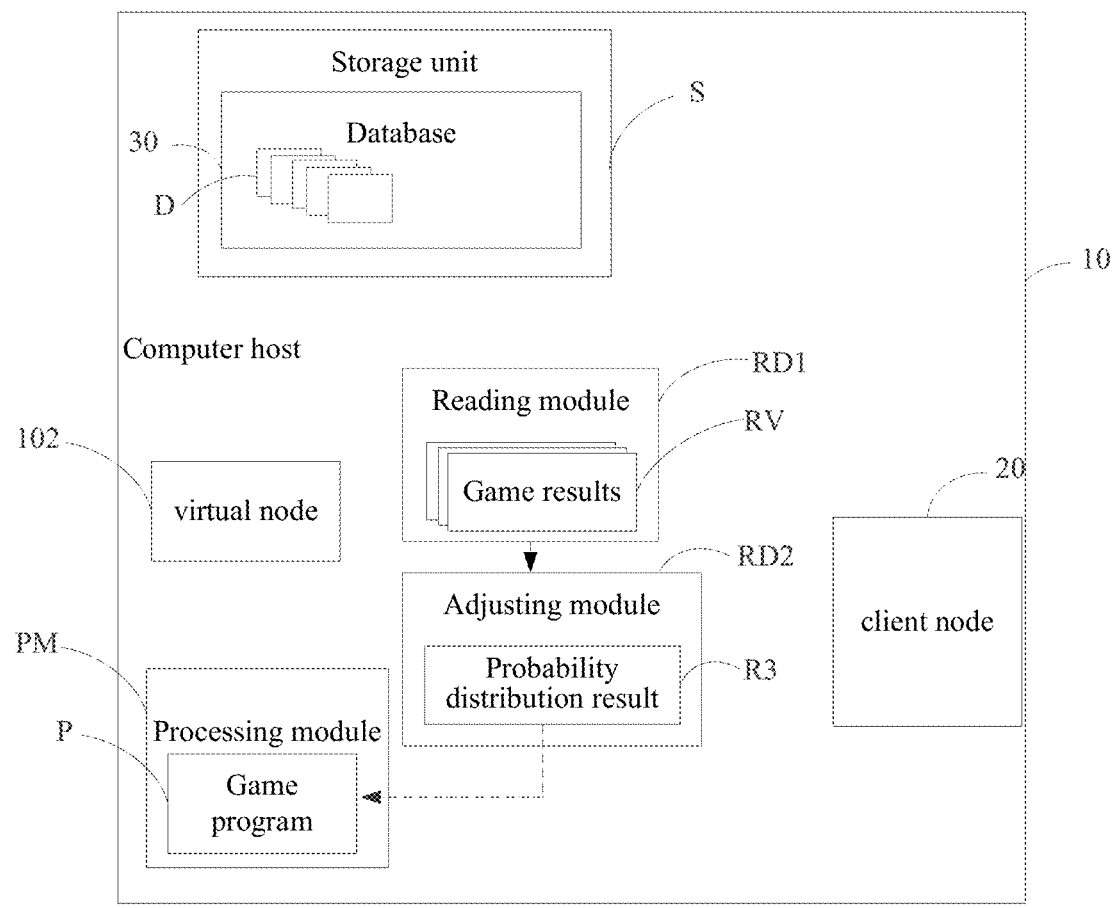
FIG. 7 shows a schematic diagram of partial steps according to another embodiment of the present invention.

Please refer again to FIG. 7. The computer host 10 of the game system 1 using the method for adjusting the strength of turn-based game automatically according to the present invention further comprises a reading module RD1 and an adjusting module RD2.

In the step 42, the computer host 50 uses the reading module RD1 to read a plurality of game results RV or the odds ratio information stored in a plurality of game data D of the database 30. The plurality of game results RC are the game results between the client node 20 and the virtual node 102 in the game program P. The odds ratio information is the odd ratios of the client node 20 versus the virtual node 102 with different Elo ratings. In the step S44, the computer host 10 adjusts the probability distribution result R3 via the adjusting module RD2 according to the plurality of game results RV and further provides the probability distribution result R3 to the processing module PM. Thereby, the computer host 10 will adjust the corresponding game-strength parameter z of the virtual node 102, as shown in FIG. 3C, according to the probability distribution result R3 for controlling the action of the virtual node 102. For example, add the second virtual object V2 in the execution region A according to the coordinate location of the first virtual object V1 disposed on the execution region A at the client node 20. When a corresponding odds ratio of the plurality of game results RV is greater than a odds-ratio threshold value, the computer host 10 increases the Elo rating of the virtual node 102. Otherwise, the computer host 10 lowers the Elo rating of the virtual node 102. For example, when the odds ratio of the user operating the first virtual object V1 at the client node 20 over the second virtual object V2 of the virtual node 102 is greater than 50%, the computer host 10 increases the Elo rating of the virtual node 102 via the processing module PM.

Accordingly, the method for adjusting the strength of turn-based game automatically according to the present invention not only can adjust the game difficulty level of turn-based games according to the decision results given by searching the database, it also can further adjust the game difficulty level according to the game result between the client node and the virtual node for granting level certificate to the user.

Please refer again to FIG. 6. The method further comprises steps of:

Step S72: Read connection count of client node to game program; and

Step S74: Judge certificate level of client node according to connection count to game program and game results of client node or according to connection count to game program and corresponding game-strength parameter of virtual node.

In the step S72, the computer host 10 reads the connection count of the client node 20 to the game program P from the database 30. In the step S74, the computer host 10 grants a certificate level, for example, the level of the game of go or the Chinese chess, via the processing module PM according to the connection count of the client node 20 to the game program P and the game results or according to a game-strength parameter of the virtual node 102 in the game program P corresponding to the client node 20. When the operating module PM of the computer host 10 judges the connection count of the client node 20 to the game program P and judges that a corresponding odds ratio of the plurality of game results RV of over the virtual node 102 is greater than an odds-ratio threshold value of the certificate level, the computer host 10 grants the certificate level, for example, the first level of the game of go. If the connection count of the client node 20 of the users participating certification to the game program P is greater than 20 and the odds ratio of the client node 20 over the corresponding virtual node 102 of the certificate level is greater than 50%, the computer host 10 grants the certificate level. Alternatively, when the operating module PM of the computer host 10 judges that the game-strength parameter z of the virtual node 102 is greater than a strength threshold value according to the strength parameter information of the game program P, the client node 20 wins the virtual node, and the connection count of the client node 20 is greater than the count threshold value, the computer host 10 grants the certificate level. For example, if the connection count of the client node 20 of the users participating certification to the game program P is greater than 20 and the corresponding game-strength parameter z of the virtual node 102 is 0.5, which is greater than 0.3 corresponding to the first level of the game of go, the computer host 10 grants the level of the user is the first level of the game of go.

Figure 8:
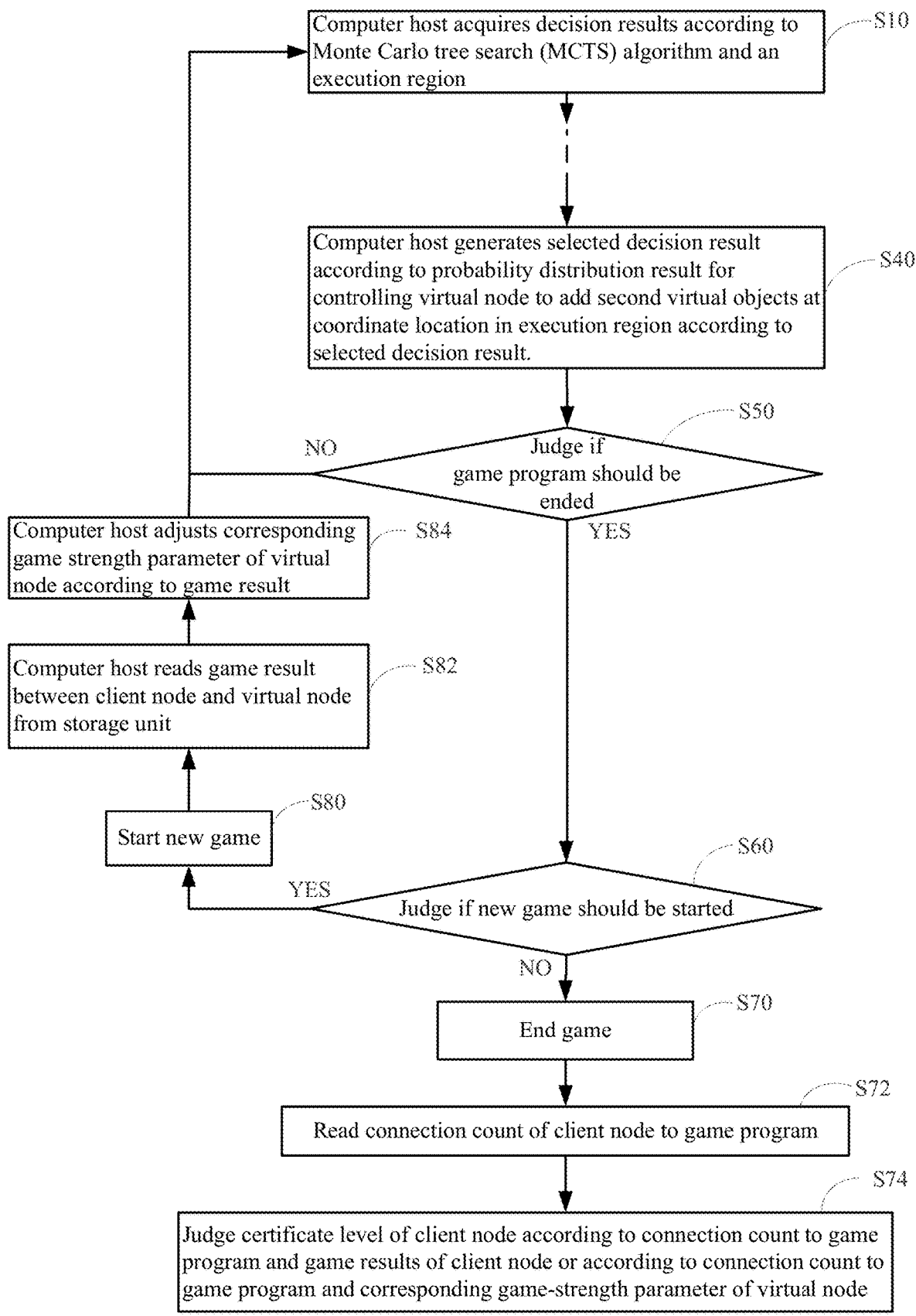
FIG. 8 shows a flowchart of the turn-based game according to another embodiment of the present invention.

Please refer to FIG. 8, which shows a flowchart of the turn-based game according to another embodiment of the present invention. The difference between FIG. 6 and FIG. 8 is that the steps S42 and S44 in FIG. 6 are executed before judging if the game should be ended and steps S82 and S84 are executed after a new game is started.

Figure 9:
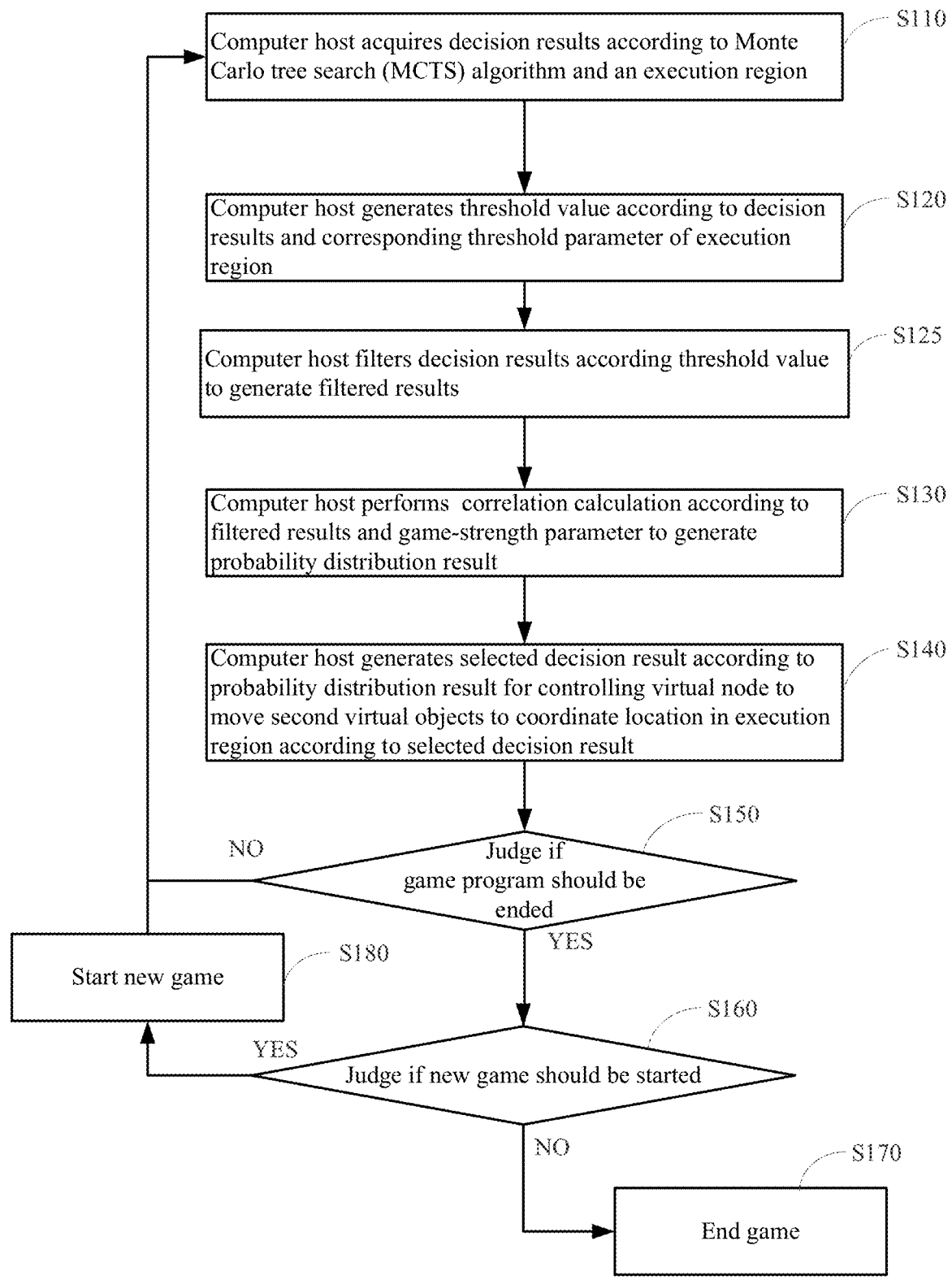
FIG. 9 shows a flowchart of the turn-based game according to another embodiment of the present invention.

Please refer to FIG. 9, which shows a flowchart of the turn-based game according to another embodiment of the present invention. The difference between FIG. 5 and FIG. 9 is that, in FIG. 5, the level setting value of the client node is received for further combining the execution region A and the Monte Carlo tree search algorithm to search the decision results R1. The decision results R1 are filtered to give the filtered results R2, which is used for giving the probability distribution result R3. Then the virtual node 102 is controlled to add a second virtual object V2 at the coordinate location in the execution region A according to the probability distribution result R3. On the contrary, in FIG. 9, the probability distribution result R3 controls the virtual node 102 to move, instead of adding, one or more of a plurality of second virtual objects V2 to the coordinate location in the execution region A. Thereby, in addition to controlling the virtual node 102 to add a second virtual object V2 at the coordinate location in the execution region A using the probability distribution result R3, the present invention can further control the virtual node 102 to move one or more of a plurality of second virtual objects V2 to the coordinate location in the execution region A according to the probability distribution result R3. The method for adjusting the strength of turn-based game automatically comprises steps of:

Step S110: Computer host acquires decision results according to Monte Carlo tree search (MCTS) algorithm and execution region;

Step S120: Computer host generates threshold value according to corresponding decision results and threshold parameter of execution region;

Step S125: Computer host filters decision results according threshold value to generate filtered results;

Step S130: Computer host performs correlation calculation according to filtered results and game-strength parameter to generate probability distribution result; and Step S140: Computer host generates selected decision result according to probability distribution result for controlling virtual node to move second virtual objects to coordinate location in execution region according to selected decision result.

Figure 10A:
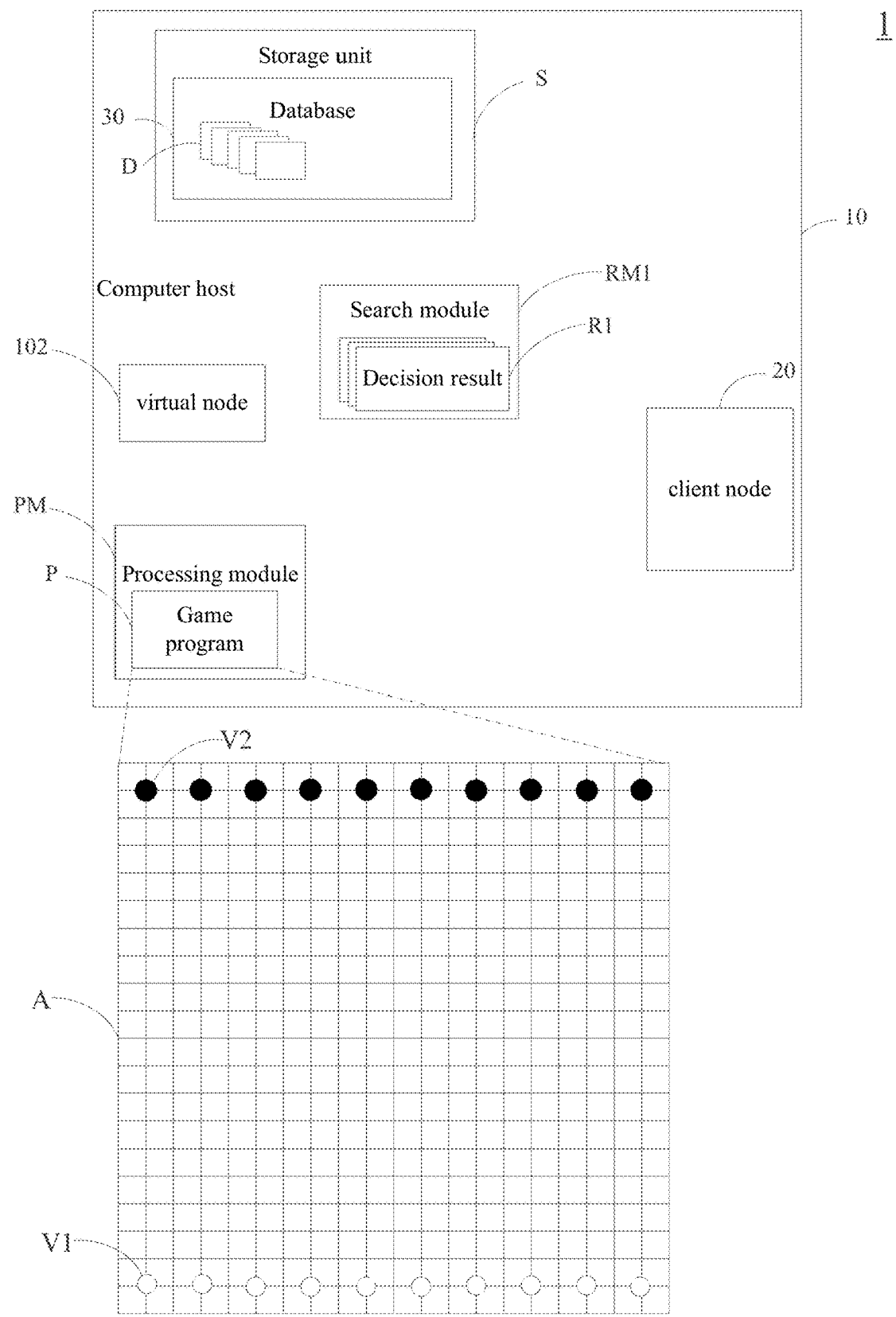
FIG. 10A to FIG. 10D show schematic diagrams of partial steps according to an embodiment of the present invention.
Figure 10B:
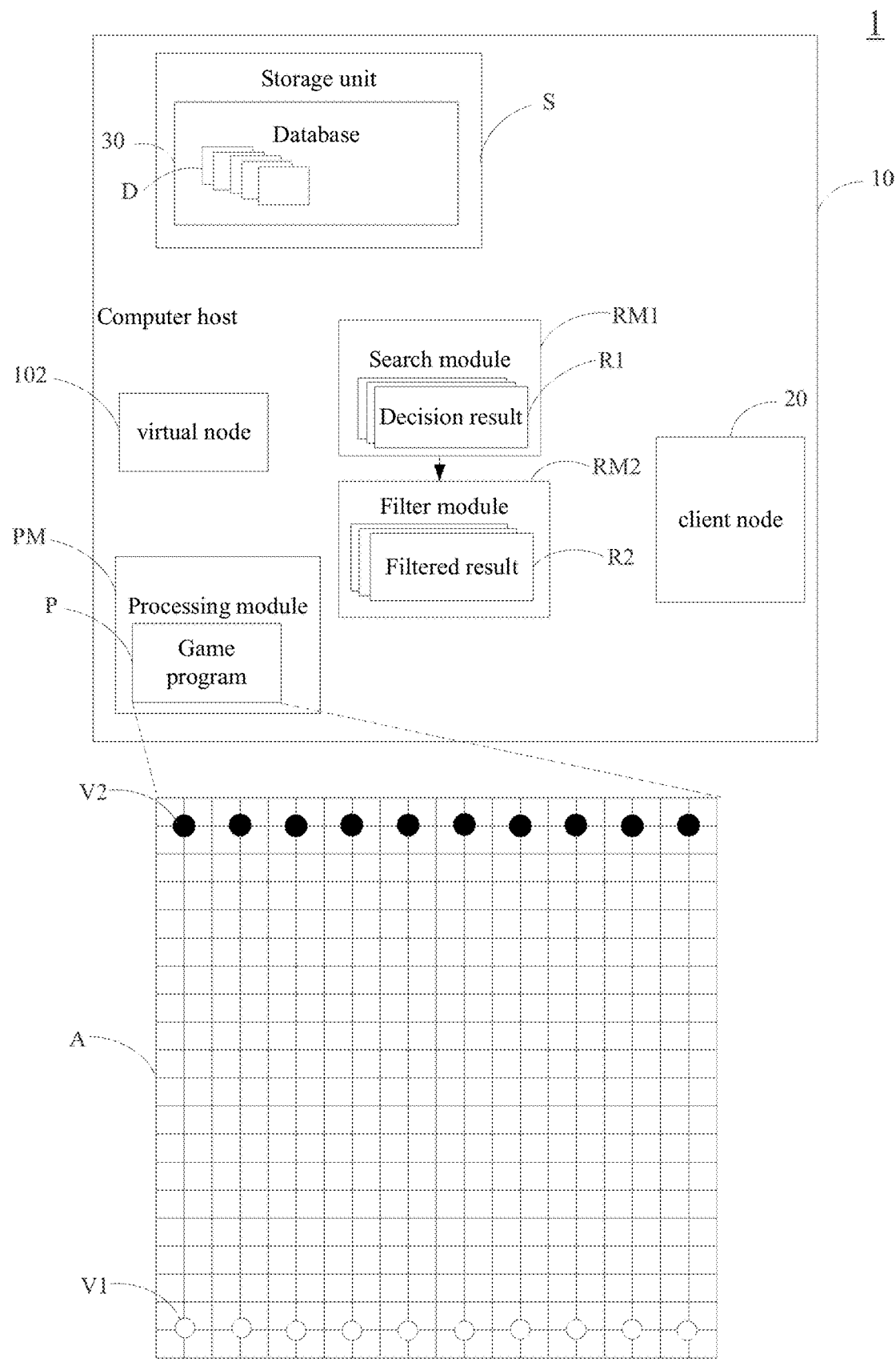
Figure 10C:
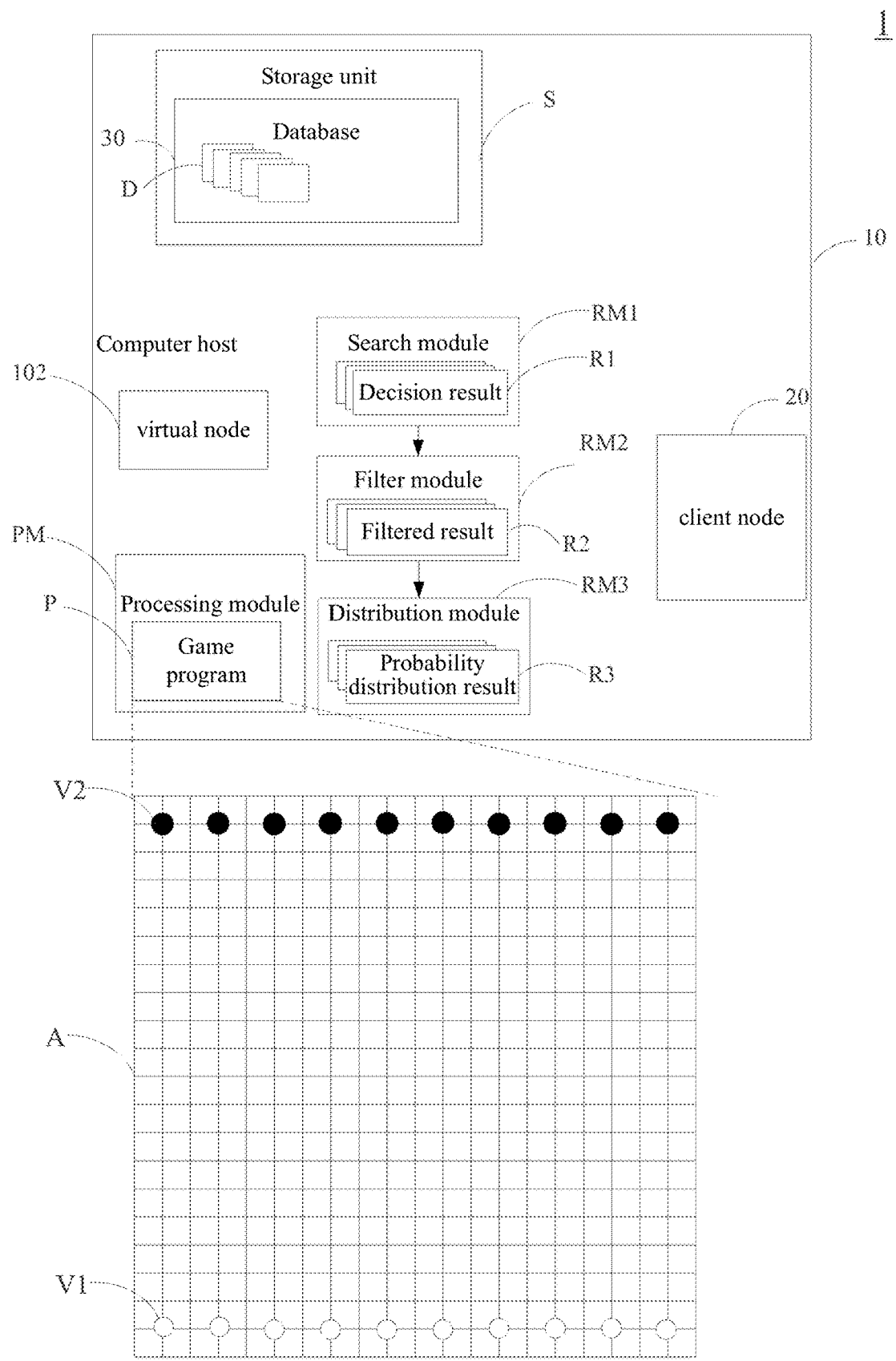
Figure 10D:
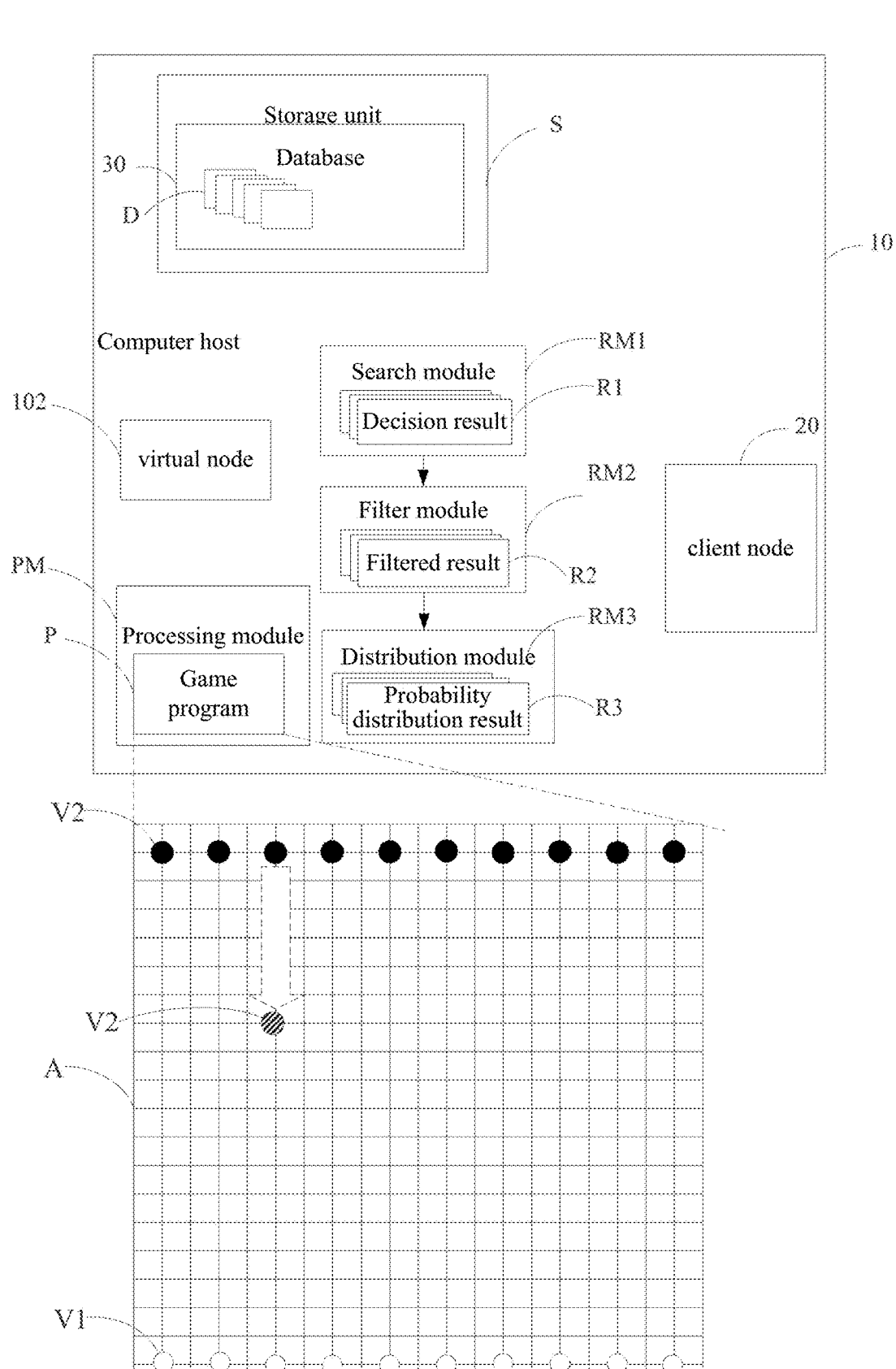

Please refer to FIG. 10A to FIG. 10D. FIG. 10A to FIG. 10C are identical to FIG. 2A to FIG. 2C as described above. The corresponding steps S110 to S130 are identical to the steps S10 to S30. Hence, they will not be described again. In the step S140, as shown in FIG. 10D, the computer host 10 controls the virtual node 102 according to the probability distribution result R3 to move the one or more second virtual object V2 to one or more coordination location in the execution region A, namely, the intersection of lines.

As shown in FIG. 9, the method for adjusting the strength of turn-based game automatically according to the present invention further comprises the steps S150 to S180, which are identical to the steps S50 to S80. Hence, they will not be described again.

Figure 11:
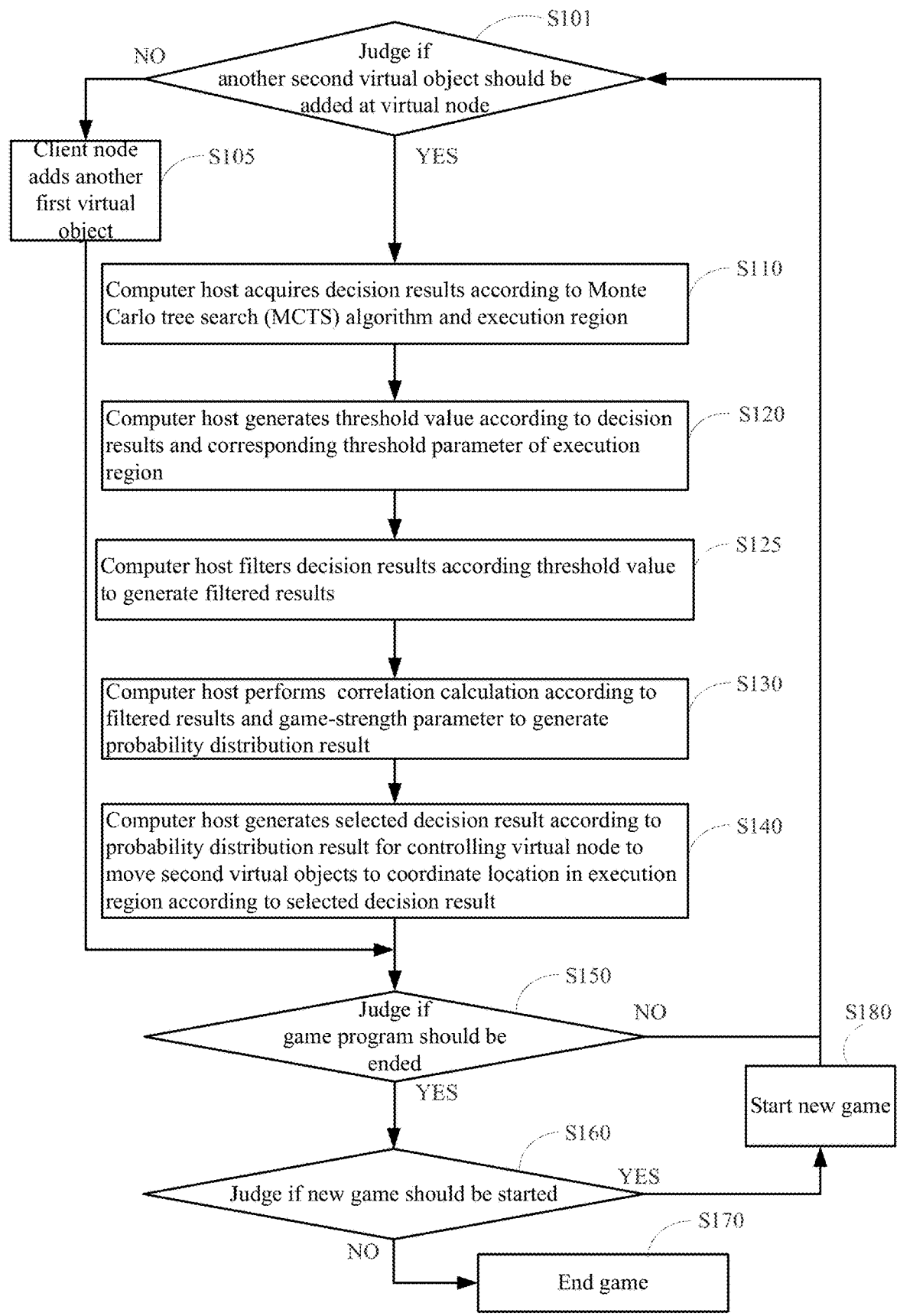
FIG. 11 shows a flowchart of the turn-based game according to another embodiment of the present invention.

As shown in FIG. 11, the method for adjusting the strength of turn-based game automatically according to the present invention further comprises the steps S101 and S105. The difference between the above steps S1, S5 and the steps S101, S105 is that the former judge whether to add another second virtual object V2 at the virtual node 102 and add another first virtual object V1 at the client node 20, respectively. On the contrary, the steps S101 and S105 judge whether to move the second virtual object V2 at the virtual node 102 and move the first virtual object V1 at the client node 20, respectively.

Figure 12:
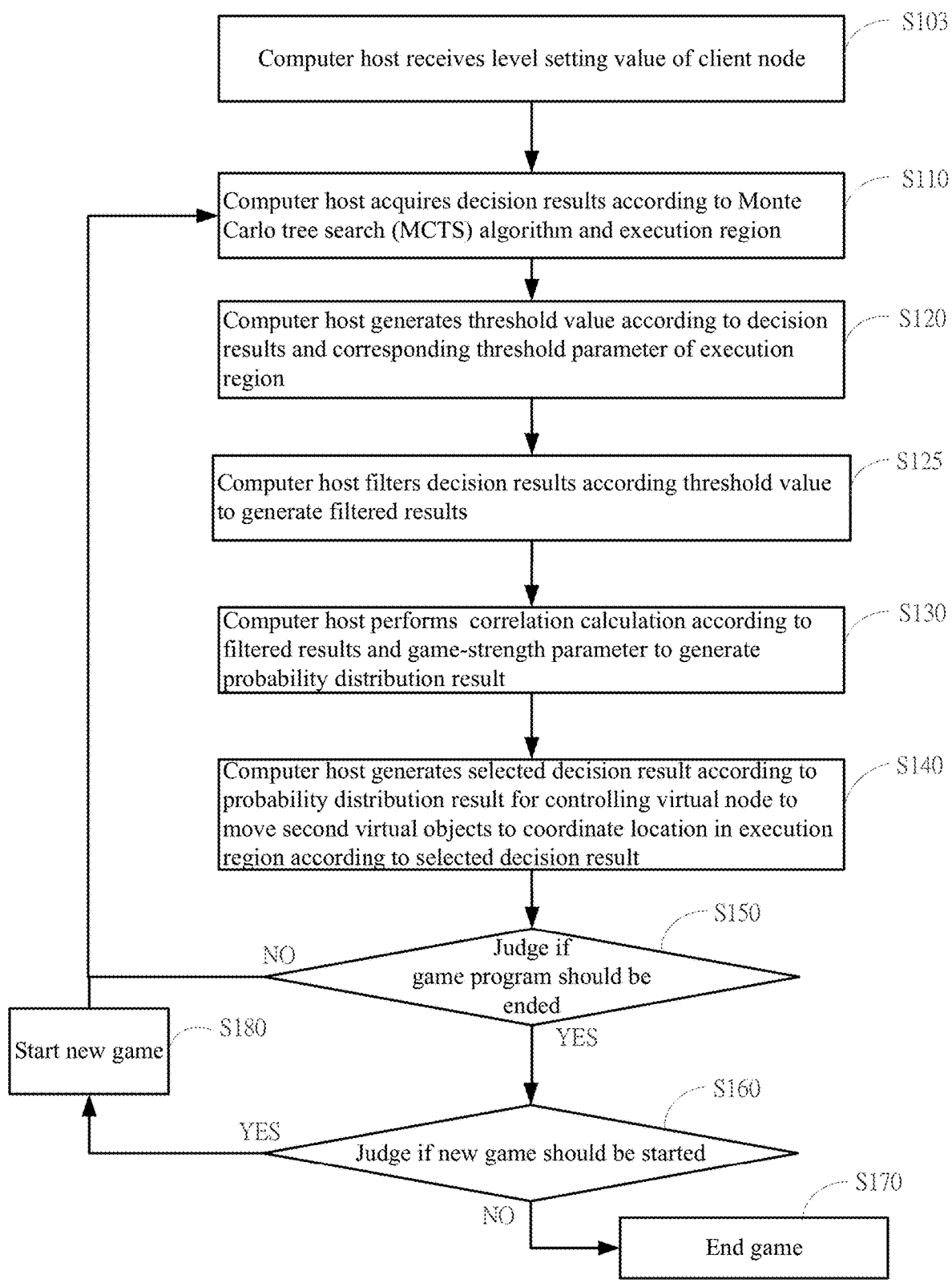
FIG. 12 shows a flowchart of the turn-based game according to another embodiment of the present invention.

As shown in FIG. 12, the method for adjusting the strength of turn-based game automatically according to the present invention further comprises the steps further comprises a step S103, which is identical to the step S3 as described above. Hence, the details will not be described again.

In addition, the embodiment in FIG. 9 to FIG. 12 can be further combined with the embodiment in FIG. 6 or FIG. 8 for adjusting game-strength parameter or level certification.

To sum up, the method for adjusting the strength of turn-based game automatically according to the present invention provides a computer host to execute a game program. The built-in virtual node in the computer host is used to emulate a client node and become the opponent of the client node in the game program. Then the user can operate the client node of the computer host to battle with the virtual node built by the computer host. The computer host adjusts according to the game results for increasing the playability of the game. Besides, the method can further grant level certification for the user according to the game results.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

What is claimed is:

1. A method for adjusting an strength of turn-based game automatically, applied to a computer host executing a game program according to a client node and a virtual node, said game program including an execution region, said client node and said virtual node controlling and adding one or more first virtual object and one or more second virtual object in said execution region, respectively, said virtual node executing said method in each turn, said method comprising steps of:
    said computer host acquiring a plurality of decision results according to a Monte Carlo tree search (MCTS) algorithm and said execution region;
    said computer host generating a threshold value according to said decision results and a corresponding threshold parameter of said execution region;
    said computer host filtering said plurality of decision results according said threshold value to generate a plurality of filtered results;
    said computer host performing correlation calculation according to said plurality of filtered results and a game-strength parameter to generate a probability distribution result; and
    said computer host generating a selected decision result according to said probability distribution result for controlling said virtual node to add another second virtual object at a coordinate location in said execution region according to said selected decision result.

2. The method for adjusting the strength of turn-based game automatically of claim 1, and before said step of said computer host acquiring a plurality of decision results according to a Monte Carlo tree search (MCTS) algorithm and said execution region, further comprising steps of:
    said computer host judging whether another first virtual object is added in said execution region at said virtual node or not; and
    adding said another first virtual object in said execution region at said client node if said judgement is negative.

3. The method for adjusting the strength of turn-based game automatically of claim 1, and before said step of said computer host acquiring a plurality of decision results according to a Monte Carlo tree search (MCTS) algorithm and said execution region, further comprising a step of said computer host receiving a level setting value of said client node such that said computer host can further acquire said plurality of decision results correspondingly according to said level setting value.

4. The method for adjusting the strength of turn-based game automatically of claim 1, and after said step of said computer host generating a selected decision result according to said probability distribution result for controlling said virtual node to add another second virtual object at a coordinate location in said execution region according to said selected decision result, further comprising steps of:
    said computer host reading a plurality of game results of said game program between said client node and said virtual node from a storage unit; and
    said computer host adjusting said game strength parameter according to said plurality of game results and said probability distribution result, said computer host increasing said game strength parameter when a corresponding odd ratio of said plurality of game results is greater than a odds-ratio threshold value, and said computer host decreasing said game strength parameter when a corresponding odd ratio of said plurality of game results is not greater than a odds-ratio threshold value.

5. The method for adjusting the strength of turn-based game automatically of claim 1, and after said step of said computer host generating a selected decision result according to said probability distribution result for controlling said virtual node to add another second virtual object at a coordinate location in said execution region according to said selected decision result, further comprising steps of:
    reading the connection count of said client node to said game program; and
    judging a certificate level of said client node according to said connection count of said client node to said game program and said plurality of game results or according to said connection count of said client node to said game program and said game strength, said computer host granting said certificate level when said connection count is greater than a count threshold value and when a corresponding odd ratio of said plurality of game results is greater than an odd-ratio threshold value, and said computer host granting said certificate level when said connection count is greater than a count threshold value and when said game-strength parameter is greater than a strength threshold value of said certificate level.

6. A method for adjusting an strength of turn-based game automatically, applied to a computer host executing a game program according to a client node and a virtual node, said game program including an execution region, said client node and said virtual node controlling and moving one or more first virtual object and one or more second virtual object in said execution region, respectively, said virtual node executing said method in each turn, said method comprising steps of:
    said computer host acquiring a plurality of decision results according to a Monte Carlo tree search (MCTS) algorithm and said execution region;
    said computer host generating a threshold value according to said decision results and a corresponding threshold parameter of said execution region;

said computer host filtering said plurality of decision results according said threshold value to generate a plurality of filtered results;

said computer host performing correlation calculation according to said plurality of filtered results and a game-strength parameter of said virtual node to generate a probability distribution result; and said computer host generating a selected decision result according to said probability distribution result for controlling said virtual node to move one or more of said plurality of second virtual objects to one or more coordinate location in said execution region according to said selected decision result.

7. The method for adjusting the strength of turn-based game automatically of claim 6, and before said step of said computer host acquiring a plurality of decision results according to a Monte Carlo tree search (MCTS) algorithm and said execution region, further comprising steps of:

said computer host judging whether one or more of said plurality of second virtual objects are moved in said execution region at said virtual node or not; and moving one or more of said plurality of first virtual objects in said execution region at said client node if said judgement is negative.

8. The method for adjusting the strength of turn-based game automatically of claim 6, and before said step of said computer host acquiring a plurality of decision results according to a Monte Carlo tree search (MCTS) algorithm and said execution region, further comprising a step of said computer host receiving a level setting value of said client node such that said computer host can further acquire said plurality of decision results correspondingly according to said level setting value.

9. The method for adjusting the strength of turn-based game automatically of claim 6, and after said step of said computer host generating a selected decision result according to said probability distribution result for controlling said virtual node to add another second virtual object at a coordinate location in said execution region according to said selected decision result, further comprising steps of:

said computer host reading a plurality of game results of said game program between said client node and said virtual node from a storage unit; and said computer host adjusting said game strength parameter according to said plurality of game results and said probability distribution result, said computer host increasing said game strength parameter when a corresponding odd ratio of said plurality of game results is greater than a odds-ratio threshold value, and said computer host decreasing said game strength parameter when a corresponding odd ratio of said plurality of game results is not greater than a odds-ratio threshold value.

10. The method for adjusting the strength of turn-based game automatically of claim 6, and after said step of said computer host generating a selected decision result according to said probability distribution result for controlling said virtual node to add another second virtual object at a coordinate location in said execution region according to said selected decision result, further comprising steps of:

reading the connection count of said client node to said game program; and judging a certificate level of said client node according to said connection count of said client node to said game program and said plurality of game results or according to said connection count of said client node to said game program and said game strength parameter, said computer host granting said certificate level when said connection count is greater than a count threshold value and when a corresponding odd ratio of said plurality of game results is greater than an odd-ratio threshold value, and said computer host granting said certificate level when said connection count is greater than a count threshold value and when said game-strength parameter of said virtual node is greater than a strength threshold value of said certificate level.

\* \* \* \* \*